US 12,406,389 B2

(12) United States Patent
Ghannam et al.

(10) Patent No.: US 12,406,389 B2
(45) Date of Patent: Sep. 2, 2025

(54) VEHICLE SPACE MORPHING

(71) Applicant: Ford Global Technologies, LLC, Dearborn, MI (US)

(72) Inventors: Mahmoud Yousef Ghannam, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 18/122,292

(22) Filed: Mar. 16, 2023

(65) Prior Publication Data

US 2024/0312043 A1    Sep. 19, 2024

(51) Int. Cl.
*G06T 7/70* (2017.01)
*G01S 17/89* (2020.01)
*G06V 20/59* (2022.01)

(52) U.S. Cl.
CPC ............. *G06T 7/70* (2017.01); *G01S 17/89* (2013.01); *G06V 20/59* (2022.01); *G06T 2207/10028* (2013.01); *G06T 2207/30268* (2013.01)

(58) Field of Classification Search
CPC ............. G06T 7/70; G06T 2207/10028; G06T 2207/30268; G06T 7/62; G06T 19/003; G06T 7/73; G06T 2210/44; G01S 17/89; G06V 20/59
USPC ....................................................... 382/100
See application file for complete search history.

(56) References Cited

U.S. PATENT DOCUMENTS

| | | | |
|---|---|---|---|
| 10,836,401 B1* | 11/2020 | Christensen | B60W 50/0098 |
| 11,062,582 B1* | 7/2021 | Van Wiemeersch | G08B 29/24 |
| 11,067,983 B2 | 7/2021 | Kentley-Klay et al. | |
| 2018/0035248 A1* | 2/2018 | Soave | H04W 4/025 |
| 2019/0339087 A1* | 11/2019 | Jindal | G06N 20/00 |
| 2020/0378775 A1* | 12/2020 | Beaurepaire | G01C 21/3423 |
| 2020/0389760 A1 | 12/2020 | Ghannam et al. | |
| 2020/0406902 A1 | 12/2020 | McBride | |
| 2022/0237965 A1* | 7/2022 | Vaccariello | H01Q 1/3241 |
| 2024/0346938 A1* | 10/2024 | Rozenberg | G08G 5/32 |

FOREIGN PATENT DOCUMENTS

CN    110895724    *    3/2020    ............. G06Q 10/04

* cited by examiner

*Primary Examiner* — Jerome Grant, II
(74) *Attorney, Agent, or Firm* — Frank Lollo; Price Heneveld LLP

(57) ABSTRACT

A method for determining spatial availability for a compartment of a vehicle includes generating, via at least one time-of-flight sensor, a first point cloud representing the compartment of the vehicle, the first point cloud including three-dimensional positional information of the compartment. The method further includes calculating, via processing circuitry in communication with the at least one time-of-flight sensor, spatial information corresponding to a target configuration for the compartment. The method further includes comparing, via the processing circuitry, the spatial information to the first point cloud. The method further includes determining an availability of the target configuration based on the comparison of the spatial information to the first point cloud.

18 Claims, 11 Drawing Sheets

VEHICLE SPACE MORPHING

FIELD OF THE DISCLOSURE

The present disclosure generally relates to space morphing for vehicles and, more particularly, relates to a detection system for determining spatial availability of a vehicle compartment.

BACKGROUND OF THE DISCLOSURE

Conventional techniques for modifying vehicle spaces may involve complex analysis of the space. Methods of determining the availability for these changes are typically challenging to carry out due to the lack of accurate three-dimensional information about the vehicle spaces and limited visualization or analysis of a transformation. There is a need for a more dynamic process for optimizing vehicle spaces.

SUMMARY OF THE DISCLOSURE

According to a first aspect of the present disclosure, a method for determining spatial availability for a compartment of a vehicle includes generating, via at least one time-of-flight sensor, a first point cloud representing the compartment of the vehicle. The first point cloud includes three-dimensional positional information of the compartment. The method further includes calculating, via processing circuitry in communication with the at least one time-of-flight sensor, spatial information corresponding to a target configuration for the compartment. The method further includes comparing, via the processing circuitry, the spatial information to the first point cloud. The method further includes determining an availability of the target configuration based on the comparison of the spatial information to the first point cloud.

Embodiments of the first aspect of the present disclosure can include any one or a combination of the following features:
- determining the target configuration based on an occupancy condition of the compartment;
- the occupancy condition includes a number of occupants and a minimum spacing between the number of occupants;
- determining the target configuration based on dimensional data of an object to be loaded into the compartment;
- generating, via the at least one time-of-flight sensor, a second point cloud representing the object to be loaded into the compartment, the second point cloud including three-dimensional positional information of the object, and calculating, via the processing circuitry, the dimensional data based on the second point cloud;
- the at least one time-of-flight sensor includes a first LiDAR module in the vehicle configured to capture the first point cloud and a second LiDAR module configured to capture the second point cloud;
- estimating a weight of the object based on the dimensional data, wherein determining the availability is based further on the weight of the object;
- identifying cargo in the compartment based on the first point cloud, and estimating a load distribution of the cargo, wherein determining the availability is based further on the load distribution;
- determining, via the processing circuitry, an unloading plan for the cargo based on the load distribution;
- determining an identity of an unloading source for the cargo based on the unloading plan, wherein the identity corresponds to a work capacity of the unloading source;
- the unloading plan includes route information for the vehicle and further includes determining the route information based on the load distribution;
- determining a timing for the unloading plan based on the load distribution;
- the timing is an arrival time for the vehicle along a target delivery route; and
- the vehicle is a first vehicle of a fleet of vehicles and further includes generating, via the at least one time-of-flight sensor, a second point cloud of a loading region of a second vehicle of the fleet of vehicles, the second point cloud including three-dimensional positional information of the compartment, comparing the first point cloud to the second point cloud, and determining a loading plan for the fleet of vehicles based on the comparison of the first point cloud to the second point cloud.

According to a second aspect of the present disclosure, a system for determining spatial availability for a compartment of a vehicle. The system includes at least one time-of-flight sensor configured to generate a first point cloud representing the compartment of the vehicle. The first point cloud includes three-dimensional positional information of the compartment. The system further includes processing circuitry in communication with the at least one time-of-flight sensor configured to calculate spatial information corresponding to a target configuration for the compartment, compare the spatial information to the first point cloud, and determine an availability of the target configuration based on the comparison of the spatial information to the first point cloud.

Embodiments of the second aspect of the present disclosure can include any one or a combination of the following features:
- the at least one time-of-flight sensor includes a first LiDAR module in the vehicle configured to capture the first point cloud and a second LiDAR module configured to capture a second point cloud of an object to be loaded into the compartment, the second point cloud includes three-dimensional positional information of the object;
- the processing circuitry is further configured to determine the target configuration based on an occupancy condition of the compartment; and
- the occupancy condition includes a number of occupants and a minimum spacing between the number of occupants.

According to a third aspect of the present disclosure, a method for determining spatial availability for a compartment of a vehicle. The method includes generating, via at least one LiDAR module, a first point cloud representing an interior of the vehicle, the first point cloud including three-dimensional positional information of the interior. The method further includes generating, via the at least one LiDAR module, a second point cloud representing an object to be loaded into the compartment of the vehicle. The second point cloud includes three-dimensional positional information of the object. The method further includes calculating, via processing circuitry in communication with the at least one LiDAR module, dimensional data of the object to be loaded based on the second point cloud. The method further includes determining, via the processing circuitry, a target configuration based on the dimensional data of the object to be loaded. The method further includes calculating, via the processing circuitry, spatial information corresponding to the target configuration for the compartment. The method further includes comparing, via the processing circuitry, the spatial information to the first point cloud. The method further includes determining an availability of the target configuration based on the comparison of the spatial information to the first point cloud.

Embodiments of the third aspect of the present disclosure can include any one or a combination of the following features:

the at least one LiDAR module includes a first LiDAR module in the vehicle configured to capture the first point cloud and a second LiDAR module configured to capture the second point cloud.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1A:
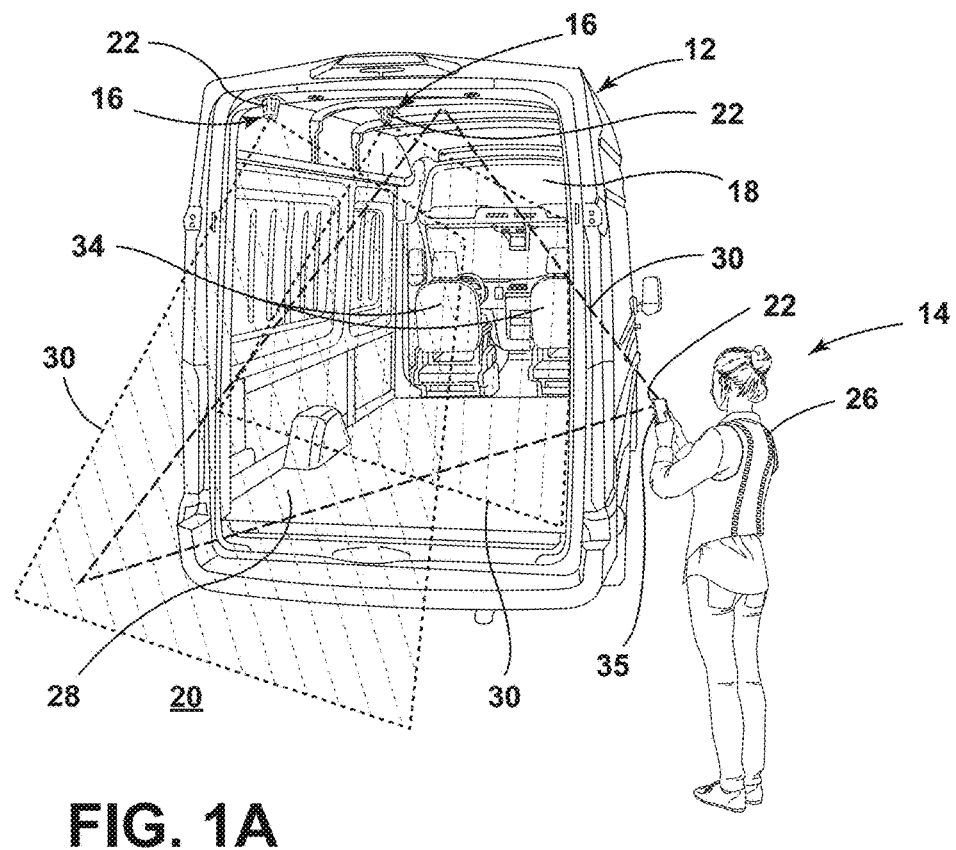
FIG. 1A is a perspective view of a cargo van incorporating a detection system of the present disclosure in a rear space of the cargo van.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to vehicle space morphing. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1A-5, the present disclosure generally relates to a detection system 10 for a vehicle 12 that utilizes three-dimensional image sensing to detect information about an environment 14 in or around the vehicle 12. The three-dimensional image sensing may be accomplished via one or more time-of-flight (ToF) sensors 16 that are configured to map a three-dimensional space such as an interior 18 of the vehicle 12 and/or a region exterior 20 to the vehicle 12. For example, the one or more time-of-flight sensors 16 may include at least one light detection and ranging (LiDAR) module 22 configured to output pulses of light, measure a time of flight for the pulses of light to return from the environment 14 to the at least one LiDAR module 22, and generate at least one point cloud 24 of the environment 14 based on the time-of-flight of the pulses of light. In this way, the LiDAR module 22 may provide information regarding three-dimensional shapes of the environment 14 being scanned, including geometries, proportions, or other measurement information related to the environment 14 and/or occupants 26 for the vehicle 12.

The LiDAR modules 22 of the present disclosure may operate conceptually similarly to a still frame or video stream, but instead of producing a flat image with contrast and color, the LiDAR module 22 may provide information regarding three-dimensional shapes of the environment 14 being scanned. Using time-of-flight, the LiDAR modules 22 are configured to measure the round-trip time taken for light to be transmitted, reflected from a surface, and received at a sensor near the transmission source. The light transmitted may be a laser pulse. The light may be sent and received millions of times per second at various angles to produce a matrix of the reflected light points. The result is a single measurement point for each transmission and reflection representing distance and a coordinate for each measurement point. When the LiDAR module 22 scans the entire "frame," or field of view 30, it generates an output known as a point cloud 24 that is a 3D representation of the features scanned.

In some examples, the LiDAR modules 22 of the present disclosure may be configured to capture the at least one point cloud 24 independent of visible-light illumination of the environment 14. For example, the LiDAR modules 22 may not require ambient light to achieve the spatial mapping techniques of the present disclosure. For example, the LiDAR module 22 may emit and receive IR or near-infrared (NIR) light, and therefore generate the at least one point cloud 24 despite visible-light conditions. Further, as compared to Radio Detection and Ranging (RADAR), the depth-mapping achieved by the LiDAR modules 22 may have greater accuracy due to the rate at which the LiDAR pulses may be emitted and received (e.g., the speed of light). Further, the three-dimensional mapping may be achieved without utilizing radio frequencies (RF), and therefore may limit or eliminate need for RF certifications for operation. Accordingly, sensors incorporated for monitoring frequencies and magnitudes of RF fields may be omitted by providing the present LiDAR modules 22.

Figure 1B:
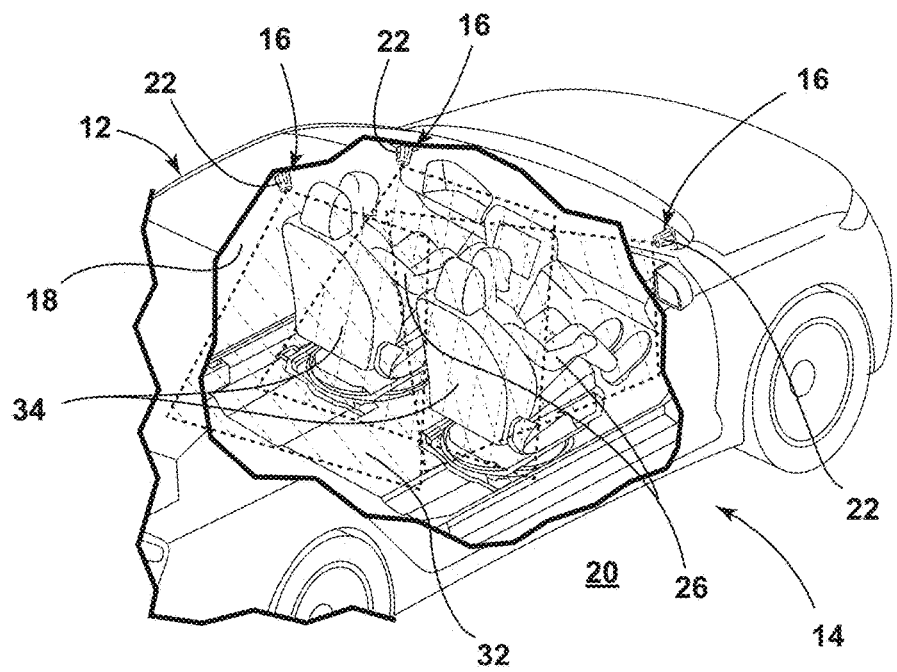
FIG. 1B is a perspective view of a car incorporating a detection system of the present disclosure in a passenger cabin of the car.

Referring now more particularly to FIGS. 1A and 1B, a plurality of the LiDAR modules 22 may be configured to monitor a compartment 28 of the vehicle 12. In the example illustrated in FIG. 1A, the LiDAR modules 22 are configured with a field of view 30 that covers the rear space of the vehicle 12, as well as the region exterior 20 to the vehicle 12. In this example, the region exterior 20 to the vehicle 12 is a space behind the vehicle 12 adjacent to an entry or an exit to the vehicle 12. In FIG. 1B, the plurality of LiDAR modules 22 are configured to monitor a front space of the vehicle 12, with the field of view 30 of one or more of the plurality of LiDAR modules 22 covering a passenger cabin 32 of the vehicle 12. As will be described further herein, it is contemplated that the plurality of LiDAR modules 22 may be in communication with one another to allow the at least one point cloud 24 captured from each LiDAR module 22 to be compared to one another to render a greater-accuracy representation of the environment 14. For example, and as depicted in FIG. 1A, the occupant 26 or another user may direct a mobile device 35 toward the environment 14 to generate an additional point cloud 24 from a viewing angle different than the field-of-views 30 of the LiDAR modules 22 of the vehicle 12. For example, the mobile device 35 may be a cellular phone having one of the LiDAR modules 22. In general, the time-of-flight sensors 16 disclosed herein may capture point clouds 24 of various features of the environment 14, such as seats 34, occupants 26, and various other surfaces or items present in the interior 18 or the region exterior 20 to the vehicle 12. As will further be discussed herein, the present system 10 may be operable to identify these features based on the at least one point cloud 24 and make determinations and/or calculations based on the identities, spatio-temporal positions of the features, and/or other related aspects of the features detected in the at least one point cloud 24.

Figure 2A:
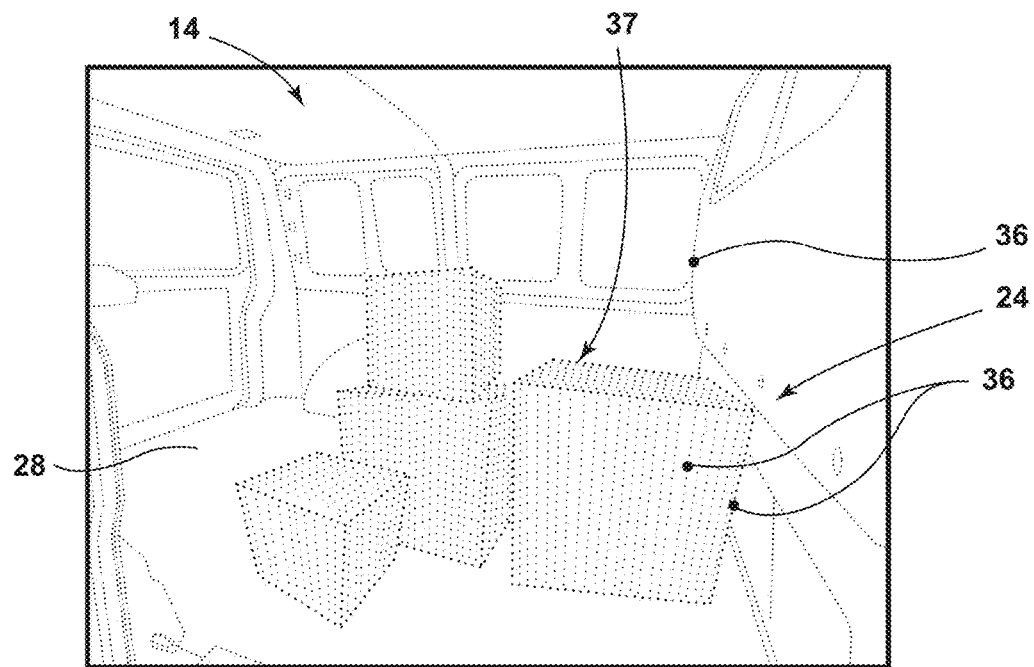
FIG. 2A is a representation of a point cloud generated by a time-of-flight sensor configured to monitor a rear space of a cargo van of the present disclosure.
Figure 2B:
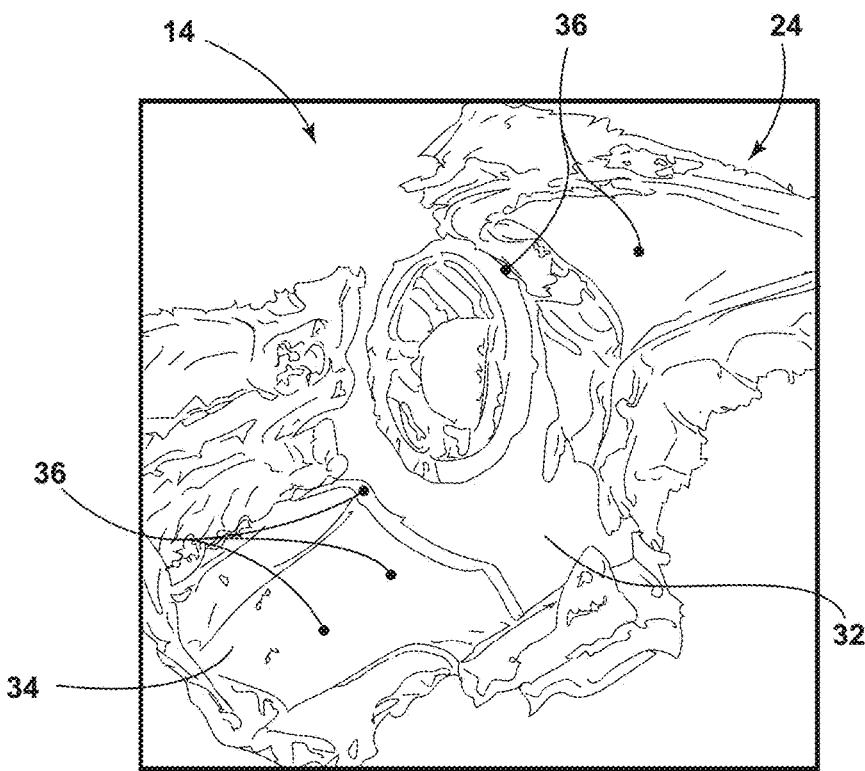
FIG. 2B is a representation of a point cloud generated by a time-of-flight sensor configured to monitor a passenger compartment of a vehicle of the present disclosure.

Referring now to FIGS. 2A and 2B, representations of at least one point cloud 24 generated from the LiDAR modules 22 in the interiors 18 of the vehicles 12 of FIGS. 1A and 1B, respectively, are presented to illustrate the three-dimensional mapping of the present system 10. For example, the depictions of the at least one point cloud 24 may be considered three-dimensional images constructed by the LiDAR modules 22 and/or processors in communication with the LiDAR modules 22. Although the depictions of the at least one point clouds 24 illustrated in FIGS. 2A and 2B may differ in appearance, it is contemplated that such difference may be a result of averaging depths of the points 36 of each point cloud 24 to render a surface (FIG. 2B) as opposed to individual dots (FIG. 2A). The underlying 3D data may be generated the same way in either case.

Still referring to FIGS. 2A and 2B, each point cloud 24 includes the three-dimensional data (e.g., a three-dimensional location relative to the LiDAR module 22) for the various features in the interior 18. For example, the at least one point cloud 24 may generate 3D mapping of the occupants 26 or cargo 37 in the interior 18. The three-dimensional data may include the rectilinear coordinates, with XYZ coordinates, of various points 36 on surfaces or other light-reflective features relative to the LiDAR module 22. It is contemplated that the coordinates of each point 36 may be virtually mapped to an origin point other than the LiDAR module 22, such as a center of mass of the vehicle, a center of volume of the compartment 28 being monitored, or any other feasible origin point. By obtaining the three-dimensional data of the various features in the interior 18 and, in some cases, the region exterior 20 to the vehicle 12, the present system 10 may provide for enhanced monitoring methods to be performed without complex imaging methods, such as those incorporating stereoscopic imagers or other three-dimensional monitoring devices that may require higher computational power or decreased efficiencies.

Figure 3:
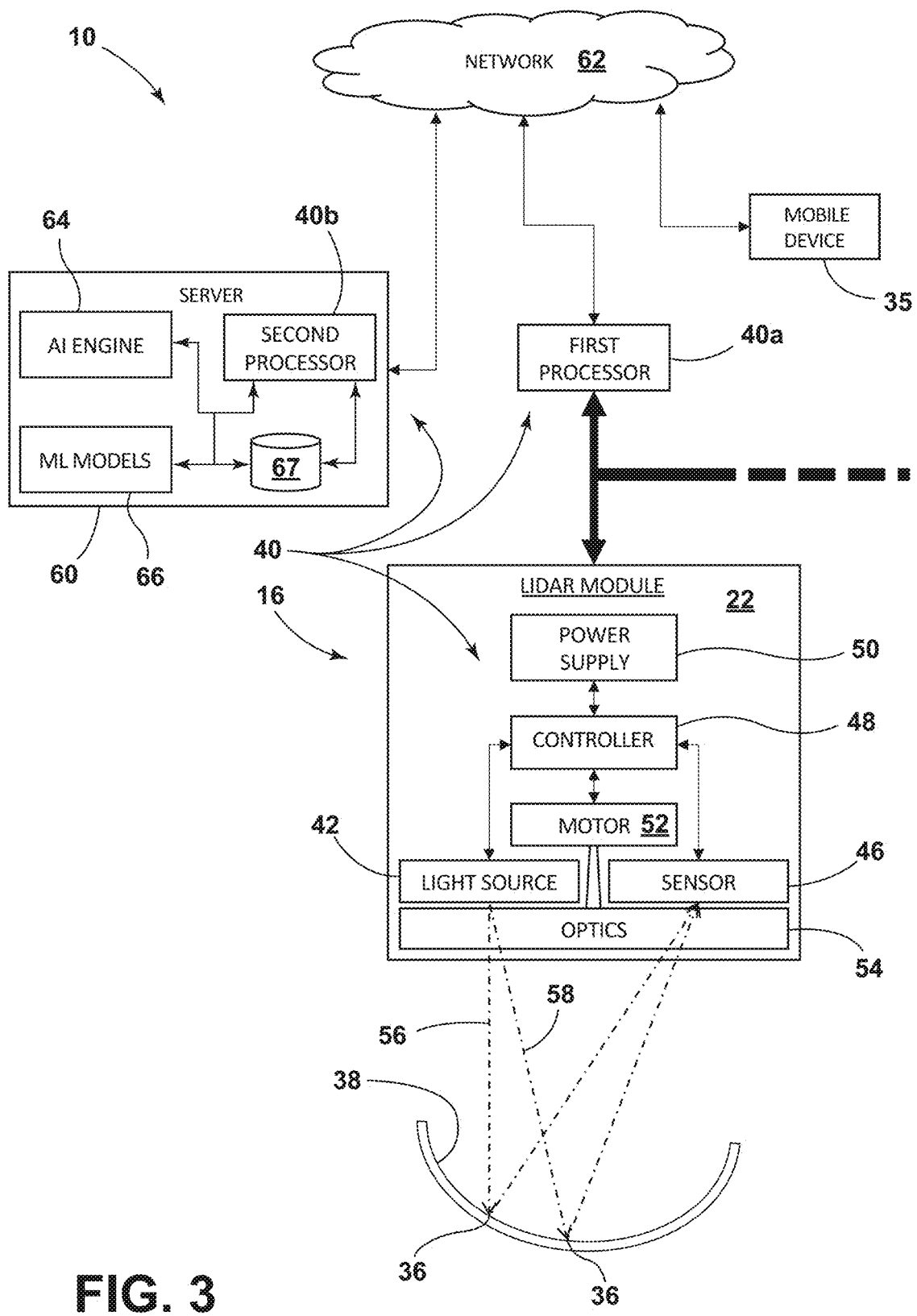
FIG. 3 is a block diagram of an exemplary detection system incorporating light detection and ranging.

Referring now to FIG. 3, at least a portion of the present detection system 10 is exemplarily applied to a target surface 38, such as to the cargo 37 or other surfaces in the environment 14 of the vehicle 12. The system 10 may include processing circuitry 40, which will be further discussed in relation to the proceeding figures, in communication with one or more of the time-of-flight sensors 16. In the present example, the time-of-flight sensors 16 include the LiDAR modules 22 each having a light source 42, or emitter, and a sensor 46 configured to detect reflection of the light emitted by the light source 42 off of the target surface 38. A controller 48 of the LiDAR module 22 is in communication with the light source 42 and the sensor 46 and is configured to monitor the time-of-flight of the light pulses emitted by the light source 42 and returned to the sensor 46. The controller 48 is also in communication with a power supply 50 configured to provide electrical power to the controller 48, the light source 42, the sensor 46, and a motor 52 that is controlled by the controller 48. In the present example, the LiDAR module 22 incorporates optics 54 that are mechanically linked to the motor 52 and are configured to guide the light pulses in a particular direction. For example, the optics 54 may include lenses or mirrors that are configured to change an angle of emission for the light pulses and/or return the light pulses to the sensor 46. For instance, the motor 52 may be configured to rotate a mirror to cause light emitted from the light source 42 to reflect off of the mirror at different angles depending on the rotational position of the motor 52.

In some examples, the optics 54 may include a first portion associated with the source 42 and a second portion associated with the sensor 46. For example, a first lens, which may move in response to the motor 52, may be configured to guide (e.g., collimate, focus) the light emitted by the source 42, and a second lens, which may be driven by a different motor or a different connection to the motor 52, may be configured to guide the light reflected off the target surface 38 and returned to the sensor 46. Accordingly, the general configuration of the LiDAR module 22 may incorporate a single housing having different sets of optics or a plurality of housings with different optics. For example, the source 42 may be located in a first housing of the LiDAR module 22, the sensor 46 may be located in a second housing separate from or spaced from the first housing. In this way, each of the LiDAR modules 22 may refer to any emitter/receiver combination system that emits LiDAR pulses and receives the LiDAR pulses either at a common location in the vehicle 12 or at different locations in the vehicle 12.

The light emitted and received by the present LiDAR modules 22 may have a wavelength in the range of between approximately 780 nanometers (nm) and 1700 nm. In some examples, the wavelength of the LiDAR is preferably in the range of between 900 nm and 1650 nm. In other examples, the wavelength of the LiDAR is preferably between 1500 nm and 1650 nm. In some examples, the wavelength of the LiDAR is preferably at least 1550 nm. It is contemplated that the particular wavelength/frequency employed by the LiDAR modules 22 may be based on an estimated distance range for capturing the depth information. For example, for shorter ranges (e.g., between 1 m and 5 m) the LiDAR may operate with a greater wavelength of light (e.g., greater than 1000 nm). The LiDAR modules 22 of the present disclosure may be configured to output light, in the form of a laser, at a wavelength of at least 1550 nm while the motor 52 rotates the optics 54 to allow mapping an area. In some examples, the LiDAR modules 22 of the present disclosure are configured to emit light having a wavelength of at least 1650 nm. Due to the relatively short distances scanned by the present LiDAR modules 22 (e.g., between one and five meters), such relatively low infrared (IR) or near-infrared (NIR) may be employed to achieve the three-dimensional spatial mapping via the at least one point cloud 24 with low power requirements. The present LiDAR modules 22 may be either single point-and-reflect modules or may operate in a rotational mode, as described above. In rotational mode, the LiDAR module 22 may measure up to 360 degrees based on the rate of rotation, which may be between 1 and 100 Hertz or may be at least 60 rotations per minute (RPM) in some examples.

In the example depicted in FIG. 3, the time-of-flight for a first pulse of light 56 emitted by the light source 42 and returned to the sensor 46 may be less than a second time-of-flight for a second light pulse emitted by the light source 42 returned to the sensor 46. For example, the first pulse of light 56 may travel a shorter distance than the second pulse of light 58 due to a difference in depth, height, or width of the corresponding reflection point 36 on the target surface 38. In this way, the LiDAR module 22 may generate the at least one point cloud 24 to be representative of the environment 14 (e.g., the target surface 38 in the present example) in three dimensions.

The processing circuitry 40 of the present disclosure may be provided to amalgamate the point cloud 24 from each of a plurality of the LiDAR modules 22 and process the coordinates of the features to determine an identity of the features, as well as to perform other processing techniques that will be further described herein. The processing circuitry 40 may include a first processor 40a local to the vehicle 12 and a second processor 40b remote from the vehicle 12. Further, the processing circuitry 40 may include the controller 48 of the LiDAR module 22. In some examples, the controller 48 may be configured to generate or determine the at least one point cloud 24 and/or point cloud data, and the first processor 40a may be configured to receive the at least one point cloud 24 from each LiDAR module 22 and compile each point cloud 24 of a common scene, such as the environment 14, to generate a more expansive or more accurate point cloud 24 of the environment 14.

The second processor 40b, which may be a part of a remote server 60 and in communication with the first processor 40a, via a network 62, may be configured to perform various modifications and/or mapping of the at least one point cloud 24 to target three-dimensional image data for the environment 14. For example, the server 60 may include an artificial intelligence (AI) engine 64 configured to train machine learning models 66 based on the point cloud data captured via the LiDAR modules 22 and/or historical data previously captured by the time-of-flight sensors 16. The second processor 40b may be in communication with the AI engine 64, as well as in communication with a database 67 configured to store the target point cloud data and/or three-dimensional image information. Accordingly, the server 60 may incorporate a memory storing instructions that, when executed by the processor, cause the processing circuitry 40 to compare the at least one point cloud 24 to point cloud data corresponding to target conditions of the interior 18 and/or the region exterior 20 to the vehicle 12. In this way, the detection system 10 may employ the processing circuitry 40 to perform advanced detection techniques and to communicate with subsystems of the vehicle 12, as will be described in the proceeding figures. In this way, the detection system 10 may be employed in tandem or in conjunction with other operational parameters for the vehicle 12. For example, the detection system 10 may be configured for communicating notifications to the occupants 26 of alert conditions, controlling the various operational parameters in response to actions detected in the interior 18, activating or deactivating various subsystems of the vehicle 12, or interacting with any vehicle systems to effectuate operational adjustments.

Figure 4:
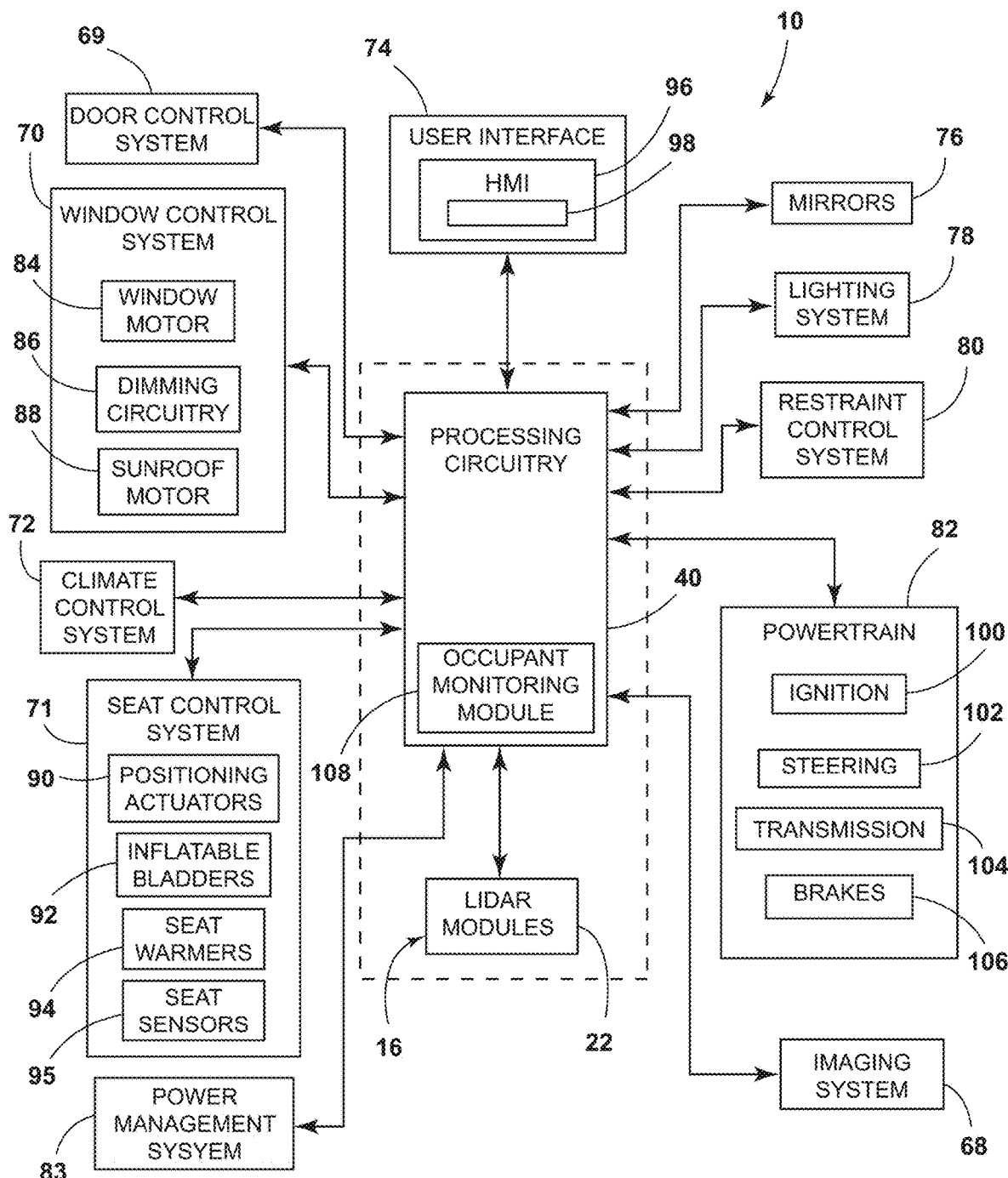
FIG. 4 is a block diagram of an exemplary detection system for a vehicle.

Referring now to FIG. 4, the detection system 10 may incorporate or be in communication with various systems of the vehicle 12 (e.g., vehicle systems). For example, the processing circuitry 40 may be configured to communicate with an imaging system 68 that includes imaging devices, such as cameras (e.g., red-, green-, and blue-pixel (RGB) or IR cameras). The processing circuitry 40 may further be in communication with other vehicle systems, such as a door control system 69, a window control system 70, a seat control system 71, a climate control system 72, a user interface 74, mirrors 76, a lighting system 78, a restraint control system 80, a powertrain 82, a power management system 83, or any other vehicle systems. Communication with the various vehicle systems may allow the processing circuitry 40 to transmit and receive signals or instructions to the various vehicle systems based on processing of the at least one point cloud 24 captured by the time-of-flight sensors 16. For example, when the processing circuitry 40 identifies a number of occupants 26 in the vehicle 12 based on the at least one point cloud 24, the processing circuitry 40 may communicate an instruction to adjust the seat control system 71 and/or the climate control system 72. In another non-limiting example, the processing circuitry 40 may receive information or signals from the lighting system 78 and control operation of the time-of-flight sensors 16 based on the information from the lighting system 78. Accordingly, the processing circuitry 40 may control, or communicate instructions to control, the time-of-flight sensors 16 based on information from the vehicle systems and/or may communicate signals or instructions to the various vehicle systems based on information received from the time-of-flight sensors 16.

The window control system 70 may include a window motor 84 for controlling a position of a window of the vehicle 12. Further, the window control system 70 may include dimming circuitry 86, which may be glazing dimming circuitry 86, for controlling an opacity and/or level of light transmitted between the interior 18 of the vehicle 12 and the region exterior 20 to the vehicle 12. One or more sunroof motors 88 may be provided with the window control system 70 for controlling closing and opening of a sunroof panel. It is contemplated that other devices may be included in the window control system 70, such as window locks, window breakage detection sensors, and other features related to operation of the windows of the vehicle 12. By providing communication between the window control system 70 and processing circuitry 40 of the present disclosure, the window control system 70 may be configured to adjust one or more of its features based on conditions determined or detected by the processing circuitry 40 based on the at least one point cloud 24. Similarly, the window control system 70 may transmit one or more signals to the processing circuitry 40, and the processing circuitry 40 may control operation of the time-of-flight sensors 16 based on the signals from the window control system 70.

The climate control system 72 may include one or more heating and cooling devices, as well as vents configured to distribute heated or cooled air into the interior 18 of the vehicle 12. Although not specifically enumerated in FIG. 4, the climate control system 72 may be configured to actuate a vent to selectively limit and allow heated air or cooled air to circulate in the interior 18 of the vehicle 12. Further, the climate control system 72 may be configured to operate heating, ventilation, and air conditioning (HVAC) systems to recirculate air or to vent air to the region exterior 20 to the vehicle 12.

The seat control system 71 may include various positioning actuators 90, inflatable bladders 92, seat warmers 94, and/or other ergonomic and/or comfort features for seats 34 in the vehicle 12. For example, the seat control system 71 may include motors configured to actuate the seat 34 forward, backward, up, down, side to side, or rotationally. Both a backrest of the seat 34 and a lower portion of the seat 34 may be configured to be adjusted by the positioning actuators 90. The inflatable bladders 92 may be provided within the seat 34 to adjust a firmness or softness of the seat 34, and seat warmers 94 may be provided for warming cushions in the seat 34 for comfort of the occupants 26. In one non-limiting example, the processing circuitry 40 may compare the position of the seats 34 based on seat sensors 95, such as position sensors, occupancy detection sensors, or other sensors configured to monitor the seats 34, to the point cloud data captured by the time-of-flight sensors 16 in order to verify or check an estimated seat position based on the point cloud data. In other examples, the processing circuitry 40 may communicate one or more signals to the seat control system 71 based on body pose data identified in the at least one point cloud 24. In yet further examples, the processing circuitry 40 may be configured to adjust an operational parameter of the time-of-flight sensors 16, such as a scanning direction, a frequency of the LiDAR module 22, or the like, based on the position of the seats 34 being monitored by the time-of-flight sensors 16.

The user interface 74 may include a human-machine interface (HMI) 96 and/or may include audio devices, such as microphones and/or speakers, mechanical actuators, such as knobs, buttons, switches, and/or a touchscreen 98 incorporated with the HMI 96. The human-machine interface 96 may be configured to present various digital objects representing buttons for selection by the user via, for example, the touchscreen 98. In general, the user interface 74 may communicate with the processing circuitry 40 to activate or deactivate the time-of-flight sensors 16, adjust operational parameters of the time-of-flight sensors 16, or control other aspects of the time-of-flight sensors 16. Similarly, the processing circuitry 40 may be configured to communicate instructions to the user interface 74 to present information and/or other data related to the detection and/or processing of the at least one point cloud 24 based on the time-of-flight sensors 16. It is further contemplated that the mobile device 35 may incorporate a user interface 74 to present similar options to the user at the mobile device 35.

Still referring to FIG. 4, other vehicle systems include the mirrors 76, the lighting system 78, and the restraint control system 80. These other vehicle systems may also be adjusted based on the at least one point cloud 24 generated by the time-of-flight sensors 16 and processed by the processing circuitry 40. Additionally, subcomponents of these systems (e.g., sensors, processors) may be configured to send instructions or data to the processing circuitry 40 to cause the processing circuitry 40 to operate the time-of-flight sensors 16 in an adjusted operation. For example, the processing circuitry 40 may be configured to deactivate the time-of-flight sensors 16 in response to the lighting system 78 detecting adequate lighting to allow for visible light and/or IR occupant monitoring. In some examples, the processing circuitry 40 may communicate an instruction to adjust a position of the mirrors 76 based on the at least one point cloud 24. For example, the at least one point cloud 24 may demonstrate an event, such as an orientation of a driver, a position of another vehicle in the region exterior 20 to the vehicle 12, or any other positional feature, and generate a signal to the mirrors 76 (or associated positioning members) to move the mirrors 76 to align a view with the event.

Referring again to FIG. 4, the vehicle 12 may include the powertrain 82 that incorporates an ignition system 100, a steering system 102, a transmission system 104, a brake system 106, and/or any other system configured to drive the motion of the vehicle 12. In some examples, the at least one point cloud 24 captured by the time-of-flight sensors 16 may be processed by the processing circuitry 40 to determine target steering angles, rates of motion or speed changes, or other vehicle operations for the powertrain 82, and communicate the target operations to the powertrain 82 to allow for at least partially autonomous control over the motion of the vehicle 12. Such at least partially autonomous control may include fully autonomous operation or semiautonomous operation of the vehicle 12. For example, the processing circuitry 40 may communicate signals to adjust the brake system 106, the ignition system 100, the transmission system 104, or another system of the powertrain 82 to stop the vehicle 12 or move the vehicle 12.

The processing circuitry 40 may further include an occupant monitoring module 108 that may communicate with any of the vehicle systems described above, as well as the time-of-flight sensors 16 of the present disclosure. The occupant monitoring module 108 may be configured to store various algorithms for detecting aspects related to the occupants 26. For example, the algorithms may be executed to monitor the interior 18 of the vehicle 12 to identify occupants 26 in the vehicle 12, a number of occupants 26, or other occupancy features of the interior 18 using the point cloud data and/or video or image data captured by the imaging system 68. Similarly, various seat sensors 95 of the seat control system 71, heating or cooling sensors that detect manual manipulation of the vents for heating or cooling control for the climate control system 72, inputs to the window control system 70, or any other sensor of the vehicle systems previously described may be processed in the occupant monitoring module 108 to detect positions of occupants 26 in the vehicle 12, conditions of occupants 26 in the vehicle 12, states of occupants 26 in the vehicle 12, or any other relevant occupancy features that will be described herein. The processing circuitry 40 may also include various classification algorithms for classifying objects detected in the interior 18, such as for the cargo 37, mobile devices 35, animals, and any other living or nonliving item in the interior 18. Accordingly, the processing circuitry 40 may be configured to identify an event in the interior 18 or predict an event based on monitoring of the interior 18 by utilizing information from the other vehicle systems.

In general, the detection system 10 may provide for spatial mapping of the environment 14 of the vehicle 12. For example, the LiDAR modules 22 may detect the position, in three-dimensional space, of objects, items, or other features in the interior 18 or the region exterior 20 to the vehicle 12. Such positions, therefore, include depth information of the scene captured by the LiDAR module 22. As compared to a two-dimensional image captured by a camera, the at least one point cloud 24 generated by the time-of-flight sensor 16 allows for more efficient determination of how far the features are from the LiDAR module 22 and from one another. Thus, complex image analysis techniques involving pixel analysis, comparisons of RGB values, or other techniques to estimate depth may be omitted due to utilization of the ToF sensors 16. Further, while multiple imaging devices from different angles of a common scene (e.g., a stereoscopic imager) may allow for more accurate estimation of depth information than those produced by a single camera, complex data processing techniques may be required for multiple cameras to be employed to gather the depth information. Further, such multi-camera systems may require additional weight, packaging volume, or other inefficiencies relative to the time-of-flight sensors 16 of the present disclosure.

Accordingly, the detection system 10 may be computationally-efficient and/or power-efficient relative to two-dimensional and three-dimensional cameras for determining positional information. Further, other time-of-flight sensing techniques, such as RADAR, while providing depth information, may present certification issues based on RF requirements and may be less accurate than the present LiDAR modules 22. Further, a number of cameras used for monitoring the environment 14 may be reduced, various presence detectors (vehicle seat sensors 95) may be omitted, and other sensors configured to determine positional information about the environment 14 may be omitted due to the precision of the LiDAR. Thus, a solution may be provided by the detection system 10 by reducing the number of sensors required to monitor various aspects of the environment 14.

Referring to FIGS. 5-13, the present system 10 may be configured to determine spatial availability for the compartment 28 of the vehicle 12. The system 10 includes at least one of the time-of-flight sensors 16. The time-of-flight sensor 16 is configured to generate a first point cloud 24a representing the compartment 28 of the vehicle 12. The first point cloud 24a includes three-dimensional positional information of the compartment 28 of the vehicle 12. The processing circuitry 40 is in communication with the at least one time-of-flight sensor 16 and is configured to calculate spatial information corresponding to a target configuration for the compartment 28. The processing circuitry 40 is further configured to compare the spatial information to the first point cloud 24a. The processing circuitry 40 is further configured to determine an availability of the target configuration based on the comparison of the spatial information to the first point cloud 24a. The availability may refer to the feasibility or operability of the target configuration to be applied to the compartment 28. For example, as will be described further herein, the target configuration may refer to a static, a pseudo-static, or a dynamic morphing level for the vehicle 12, and the processing circuitry 40 may be configured to determine whether such target configurations are possible given the spatial information and the first point cloud 24a. In some examples, the at least one time-of-flight sensor 16 includes a first LiDAR module 22a configured to generate the first point cloud 24a of the compartment 28 and a second LiDAR module 22b configured to generate a second point cloud 24b of objects 138 to be loaded.

Static morphing for the vehicle 12 may refer to permanent changes and/or up-fits that may result in modification of structural components for the vehicle 12, such as modification to mounts for the seating, modification of interior walls 120 of the vehicle 12, or the like. Generally, static morphing may refer to a significant change in the function of the interior 18 or in another compartment 28 of the vehicle 12 (e.g., bed 160 of a truck 162 converted to a cherry picker). Pseudo-static morphing may refer to cyclical updates and arrangements that may be modified but may require significant time and energy to change to or from a particular configuration. For example, a van 166 may be pseudo-statically morphed to include an office area in lieu of a cargo area in a rear of the van 166. Dynamic morphing may refer to spatial changes based on unloading or loading, picking up or dropping off cargo 37, swapping seating configurations by removing or selectively deploying particular seats 34 in the vehicle 12, adding a child seat and/or removing a child seat, or the like. In general, the differences between the morphing levels may be defined based on the amount of time or energy required to adjust an existing configuration to a target configuration and/or a degree of modification to structural components of the compartment 28. For example, as previously described, the static morphing level may involve significant modifications to the structures of the interior 18 to allow for new functions, dynamic morphing may refer to nonstructural modifications to the interior 18, and pseudo-static morphing may refer to slight or limited modifications to structural components of the interior 18.

In general, the present system 10 may be configured to utilize the time-of-flight sensors 16 to produce a three-dimensional map of the interior 18 and overlay the target configuration to determine whether such target configuration is feasible based on spatial limitations of the vehicle 12. As will be described further herein, the system 10 may be configured to access Computer-aided design (CAD) data 122 (FIG. 10) or reference data based on the individual model of the vehicle 12 and/or CAD data 122 or reference data of information relevant to objects 138 stored in the interior 18. For example, information related to packages may be stored in a database 67 after being scanned for a delivery service. Such information may include the size, weight, or other features related to three-dimensional information of an item. Further, the time-of-flight sensors 16 may be employed to capture occupancy configurations and/or seating configurations to allow for recommendation of specific dynamic morphing configurations, such as seating rearrangements or the like depending on the number of occupants 26, a comfort level for the occupants 26, or other user-driven preferences.

Figure 5:
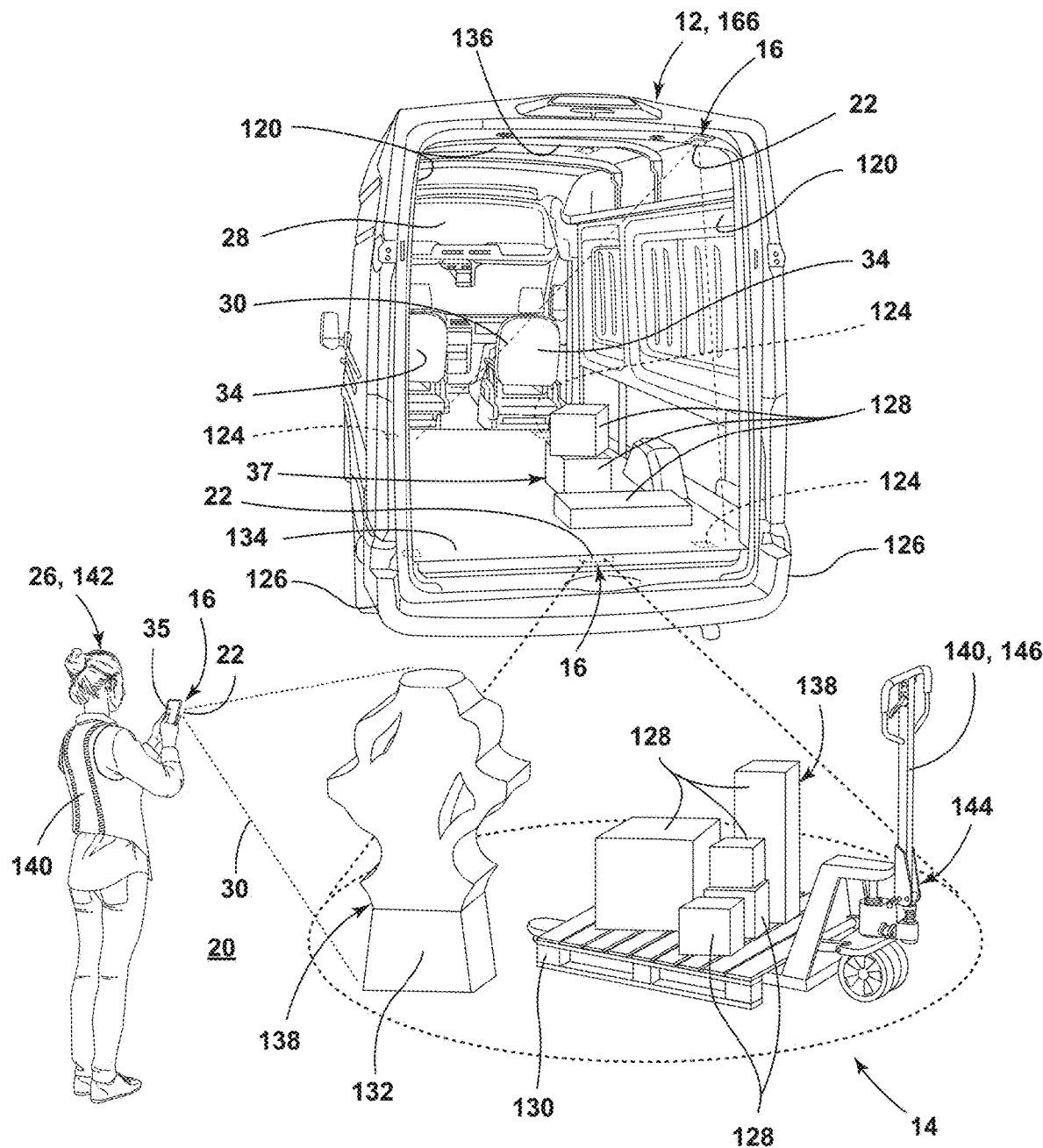
FIG. 5 is a perspective view of a loading scene for a compartment of a vehicle and an adjacent region exterior to the vehicle each being scanned by at least one LiDAR module of a detection system of the present disclosure.

Referring now more particularly to FIG. 5, an example of a dynamic morphing level selection process is generally illustrated with the present time-of-flight sensors 16 employed to scan the interior 18 as well as the region exterior 20 to the vehicle 12 in order to generate a first point cloud 24a of the interior 18 and the second point cloud 24b of the region exterior 20. The first point cloud 24 may represent the cargo 37 in the interior 18. The time-of-flight sensors 16 may be employed to generate the second point cloud 24b for the objects 138 in the region exterior 20 to the vehicle 12. As will be described further in relation to the proceeding figures, the vehicle 12 may include one or more weight sensors 124 positioned in the vehicle 12 for monitoring a load distribution in the vehicle 12. For example, the weight sensors 124 may be placed, as illustrated, at corners 126 of the rear compartment of the vehicle 12, though any other placement of the weight sensors 124 that allows for determining a load distribution in the vehicle 12 may be provided. As depicted in FIG. 5, a user may manipulate the mobile device 35, such as a phone, to adjust a time-of-flight sensor 16 of the mobile device 35. For example, one LiDAR module 22 may be incorporated into the mobile device 35, and three-dimensional positional information captured by the LiDAR module 22 of the mobile device 35 may be communicated to the processing circuitry 40, via the network 62 previously described. In this way, remote devices configured to capture the at least one point cloud 24 from different angles may be employed for greater accuracy in determining the availability for the target configuration.

Still referring to FIG. 5, the objects 138 in the region exterior 20 may be intended to be loaded into the interior 18. Such objects 138 may include boxes 128 on a pallet 130 as well as other atypically-shaped packages 132 or other items located in a loading region for the vehicle 12. In the present example, the first point cloud 24a includes the three-dimensional positional information of the walls 120, the floor 134, the ceiling 136, and the cargo 37 already in the interior 18, and the processing circuitry 40 calculates spatial information for a target configuration in which the objects 138 in the region exterior 20 to the vehicle 12 are disposed in the interior 18 alongside objects 138 already in the interior 18. Thus, the processing circuitry 40 may calculate any number of target configurations that may be physically possible to fit in the interior 18. Because the time-of-flight sensors 16 employed may be configured to map the depth of the objects 138, including the atypically-shaped package 132, the detection system 10 may continuously monitor the interior 18 while the interior 18 is being loaded to limit the number of possible target configurations that may be implemented. For example, if the atypically-shaped package 132 is loaded initially and placed toward the rear of the interior 18, the number of potential target configurations may be decreased, and different loading recommendations may be determined by the processing circuitry 40. It is contemplated that, due to the precision and quality of the points 36 generated by the LiDAR modules 22, the processing circuitry 40 may be configured to estimate the volume or space availability with greater accuracy than estimates based on other time-of-flight sensors 16 (e.g., RADAR) or cameras.

In general, the processing circuitry 40 may determine the target configuration of the compartment 28. For example, the occupancy condition may, in addition or in an alternative, include a minimum spacing between occupants 26 based on health guidelines. In some examples, the occupancy condition includes a number of occupants in the vehicle 12.

Still referring to FIG. 5, the time-of-flight sensors 16 may further be configured to generate the at least one point cloud 24 representing a loading source 140 and/or an unloading source 140. For example, the processing circuitry 40 may be configured to determine an identity of the loading or the unloading source 140 for the cargo 37 and/or the objects 138. As will be described further herein, the processing circuitry 40 may utilize the identity of the loading or the unloading source 140 to calculate an unloading plan for the cargo 37 or a loading plan for the objects 138. For example, the identity of the loading/unloading source 140 may correspond to a human 142, such as the user, or a machine 144, such as a forklift 146 or other mechanical or electromechanical machine configured to aid in lifting or loading objects 138 into or out of the compartment 28. Thus, the detection system 10 of the present disclosure may utilize the time-of-flight sensors 16 to estimate loading times, unloading times, recommended target configurations (e.g., an order of the objects 138 in the interior 18), or various other loading or unloading features of the present disclosure.

Figure 6:
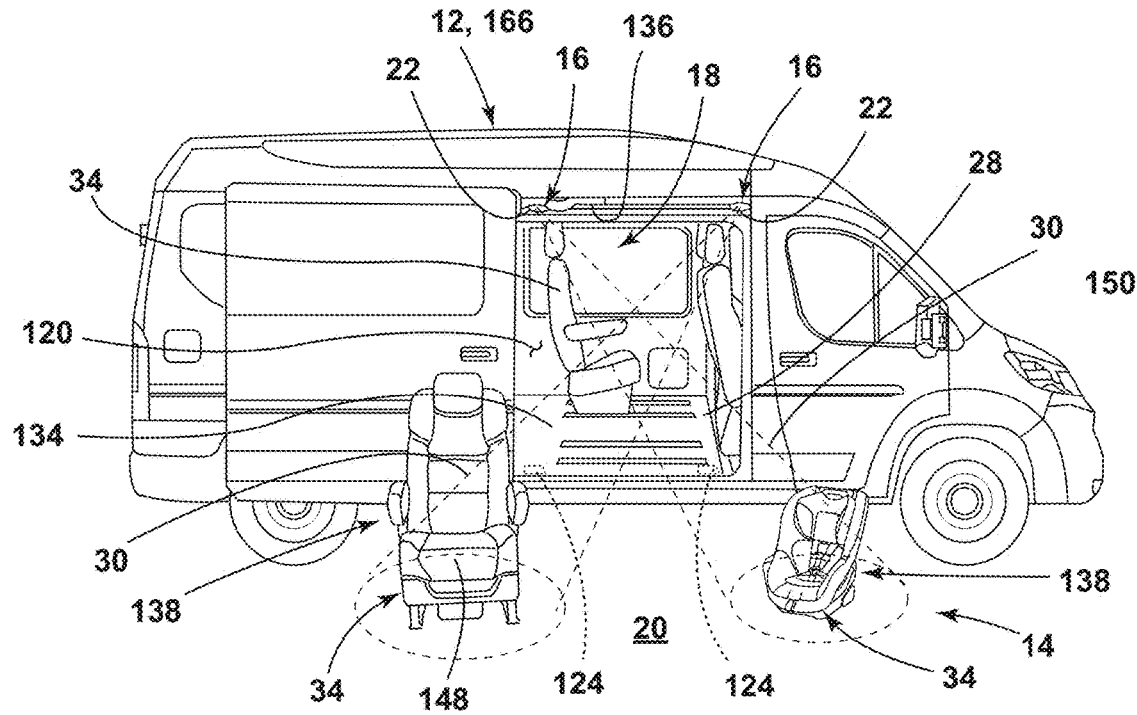
FIG. 6 is a side perspective view of a cargo van and removable seating being scanned by at least one LiDAR module demonstrating dynamic morphing for occupancy configuration modification.
Figure 7:
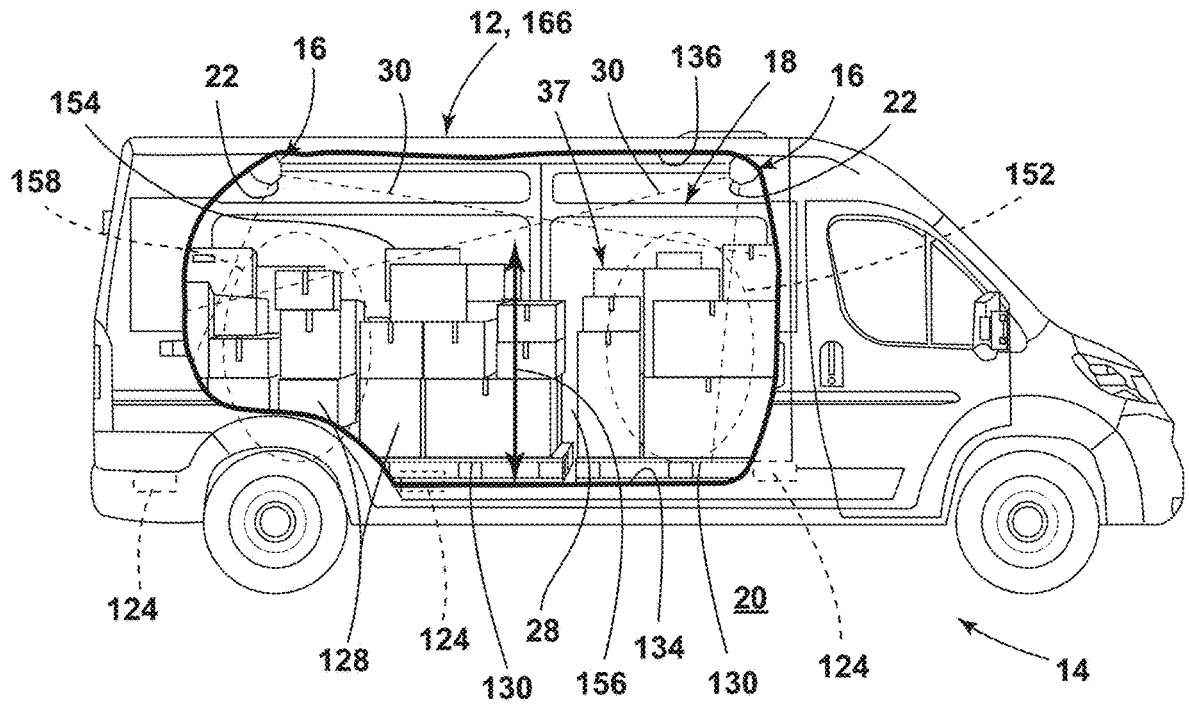
FIG. 7 is a side perspective view of a cargo van having a cutaway portion demonstrating cargo in the cargo van being monitored by a detection system of the present disclosure.

Referring now to FIGS. 6 and 7, other examples of dynamic morphing are illustrated in reference to occupancy configurations (FIG. 6) and load distributions (FIG. 7). For example, the detection system 10 may be configured to detect a rearrangement of seats 34 based on the at least one point cloud 24 of the interior 18 (e.g., the first point cloud 24a) and/or the at least one point cloud 24 of the region exterior 20 to the vehicle 12 (e.g., the second point cloud 24b). For example, the second point cloud 24b may represent a removed seat 148 from the vehicle 12 and/or a booster seat 150 removed from the vehicle 12. Based on historical data (e.g., previous LiDAR scans), the processing circuitry 40 may determine that the removed seat 148 and the booster seat 150 have been removed and/or are being placed in the vehicle 12. Accordingly, the processing circuitry 40 may detect the updated intended seating configuration (e.g., the target configuration) and present a plurality of options 182 for the users to choose from based on the automatic detection of a new intended target configuration. As will be described further herein, the recommended target configurations may be based on occupancy preferences, such as spacing from the booster seat 150 and/or spacing amongst the occupants 26 based on health guidelines (e.g., social distancing).

With specific reference to FIG. 7, the detection system 10 may utilize the time-of-flight sensors 16 in combination with the weight sensors 124 in the vehicle 12 to determine the load distribution within the interior 18. For example, the processing circuitry 40 may identify the spatial availability in the interior 18 and map portions of the spatial availability. For example, in a first region 152 of the vehicle 12, a stack 154 of cargo 37 may exceed or approach a recommended stack height 156, and in a second region 158, the stack height 156 may be below the recommended stack height 156. The spatial availability may be compared to the weight distribution, or load distribution within the interior 18 to determine recommended placement of new objects 138 in the vehicle 12 in spite of the spatial availability. For example, if the second region 158 includes more spatial availability than the first region 152, but the load is distributed toward the second region 158 (e.g., the objects 138 in the second region 158 are heavier than the objects 138 in the first region 152), the detection system 10 may determine that no free space is actually available for new objects 138. In this way, the processing circuitry 40 may utilize the information gathered from the weight sensors 124 and the time-of-flight sensors 16 to optimize loading and/or unloading procedures for the vehicle 12.

As will be also described further herein, the loading/unloading plans and/or navigational routes for the vehicle 12 may be determined based on the spatial availability and/or the target configuration for the vehicle 12. For example, if a plurality of potential objects 138 may be desired to be loaded into the vehicle 12, the processing circuitry 40 may access information about the objects 138 (e.g., a packaging weight, height, width, depth, or other spatial parameter) and determine whether or which of the plurality of objects 138 may be capable of loading into the vehicle 12. For example, the packaging parameters may be scanned during distribution (via, e.g., a barcode or RFID scanner) and uploaded to a digital library accessible by the processing circuitry 40. Based on the recommendation calculated by the processing circuitry 40, the navigational route may be adjusted to pick up or to not pick up certain packages along a target path.

Figure 8:
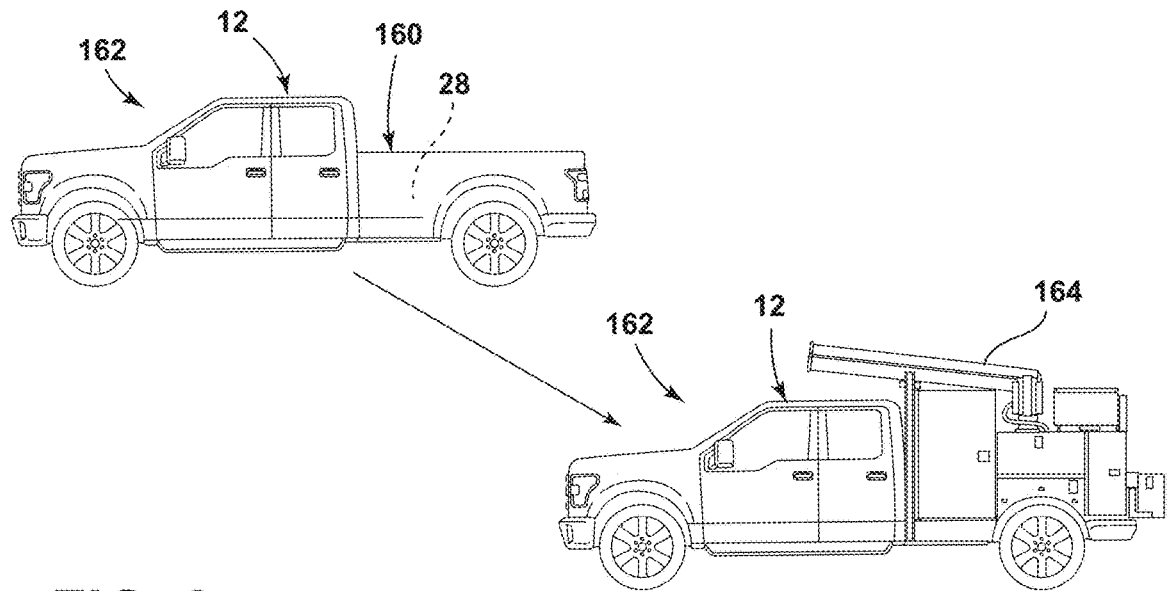
FIG. 8 demonstrates a static morphing of a truck-bed to a harvester arrangement using a detection system of the present disclosure.
Figure 9:
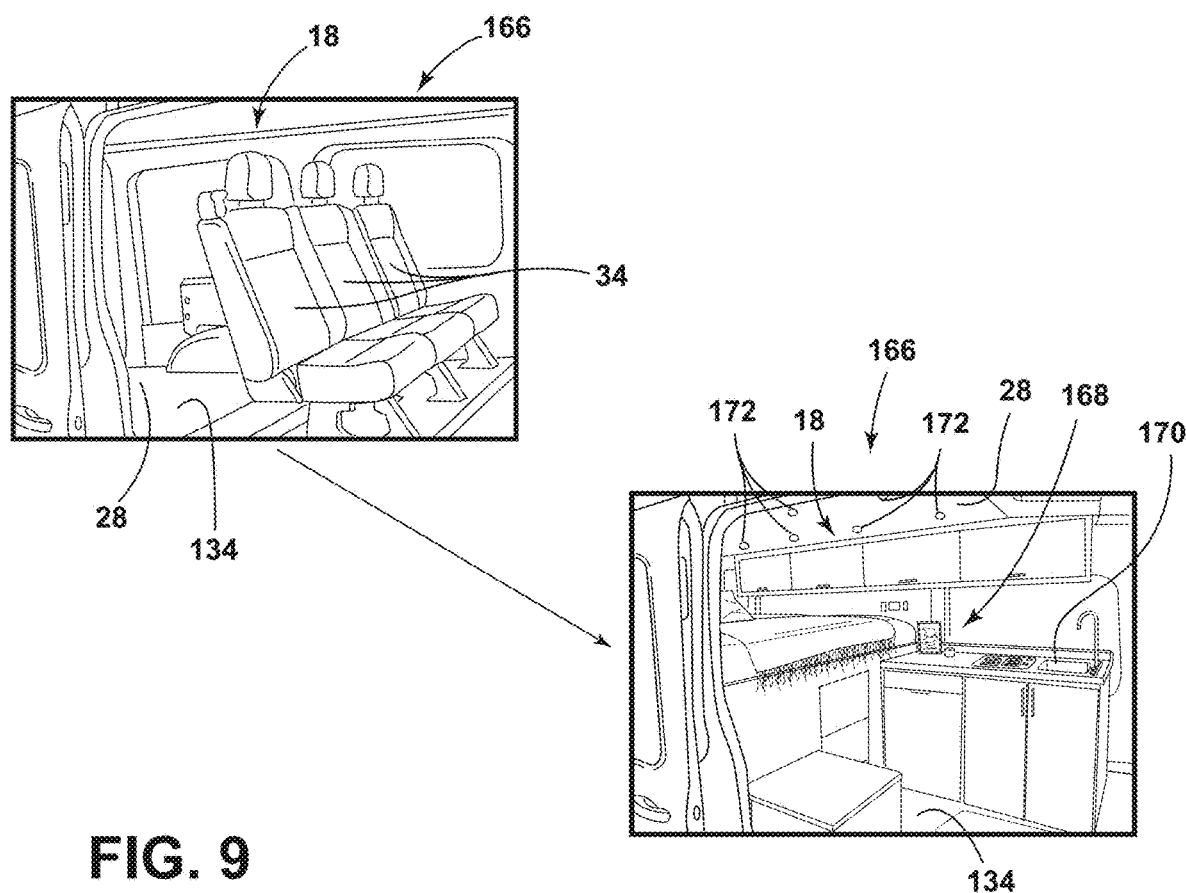
FIG. 9 demonstrates a static morphing of a passenger-cargo compartment to a kitchen/living area arrangement using a detection system of the present disclosure.

Referring now to FIGS. 8 and 9, two exemplary static morphings are illustrated in the form of a modification of a bed 160 of a truck 162 to operate as agricultural equipment 164 (FIG. 8) and as a modification of the passenger cabin 32 of a van 166 to serve as a kitchen and living area 168 for the van 166 (FIG. 9). With particular reference to FIG. 8, the detection system 10 may employ the time-of-flight sensors 16 to generate the at least one point cloud 24 of the bed 160 of the truck 162 and/or access specification data, such as CAD data 122 that includes dimensional information of the bed 160 of the truck 162, to generate a three-dimensional mapping of the bed 160 of the truck 162. If a user desires the agricultural function illustrated in FIG. 8 or any other static or permanent modification to the vehicle 12, the user may, via the user interface 74, enter a request to modify the truck 162 to the target configuration incorporating the agricultural function. Based on the three-dimensional mapping of the bed 160 of the truck 162 and the spatial information corresponding to the target configuration (e.g., a volume, and/or a geometry required for the static morphing), the processing circuitry 40 may determine one or more possible configurations for the agricultural function. Accordingly, the processing circuitry 40 may limit the number of possible configurations or deny the possibility of such a target configuration. For example, the processing circuitry 40 may be configured to estimate a load distribution for the target configuration of the truck 162 and compare the load distribution to parameters required for operation of the vehicle 12, such as maneuverability, engine power requirements, or any other vehicle operation parameter. In this way, the present system 10 may analyze exterior compartments for vehicles 12 and aid a user in selection of a permanent modification.

With particular reference to FIG. 9, the user has selected a kitchen/living area 168 modification to the passenger cabin 32 for the van 166. The processing circuitry 40 may be configured to, based on depth information from the at least one point cloud 24 generated by the time-of-flight sensors 16, recommend the target configuration illustrated and/or additional target configurations for the passenger cabin 32 based on the spatial mapping and the at least one point cloud 24. It is also contemplated that the processing circuitry 40 may be configured to limit or select potential configurations for the target configuration based on other parameters entered by the user, such as space optimization, seating optimization, location of electrical power, water sources, or other user parameters that may be described further herein. For example, the kitchen/living area 168 selected by the processing circuitry 40 may limit such possible configurations to include a sink 170 of the kitchen area located toward a front of the vehicle 12 or another portion of the vehicle 12 where a water or electrical supply may be available. Continuing with this example, the lighting fixtures 172 in the kitchen/living area 168 selected by the processing circuitry 40 may be required to be near a particular electrical power supply and therefore limit lighting options within the interior 18. In this way, the present system 10 may employ the present LiDAR detection techniques in combination with access to three-dimensional information of possible static morphing options for vehicle 12 to optimize selection of a target configuration.

Figure 10:
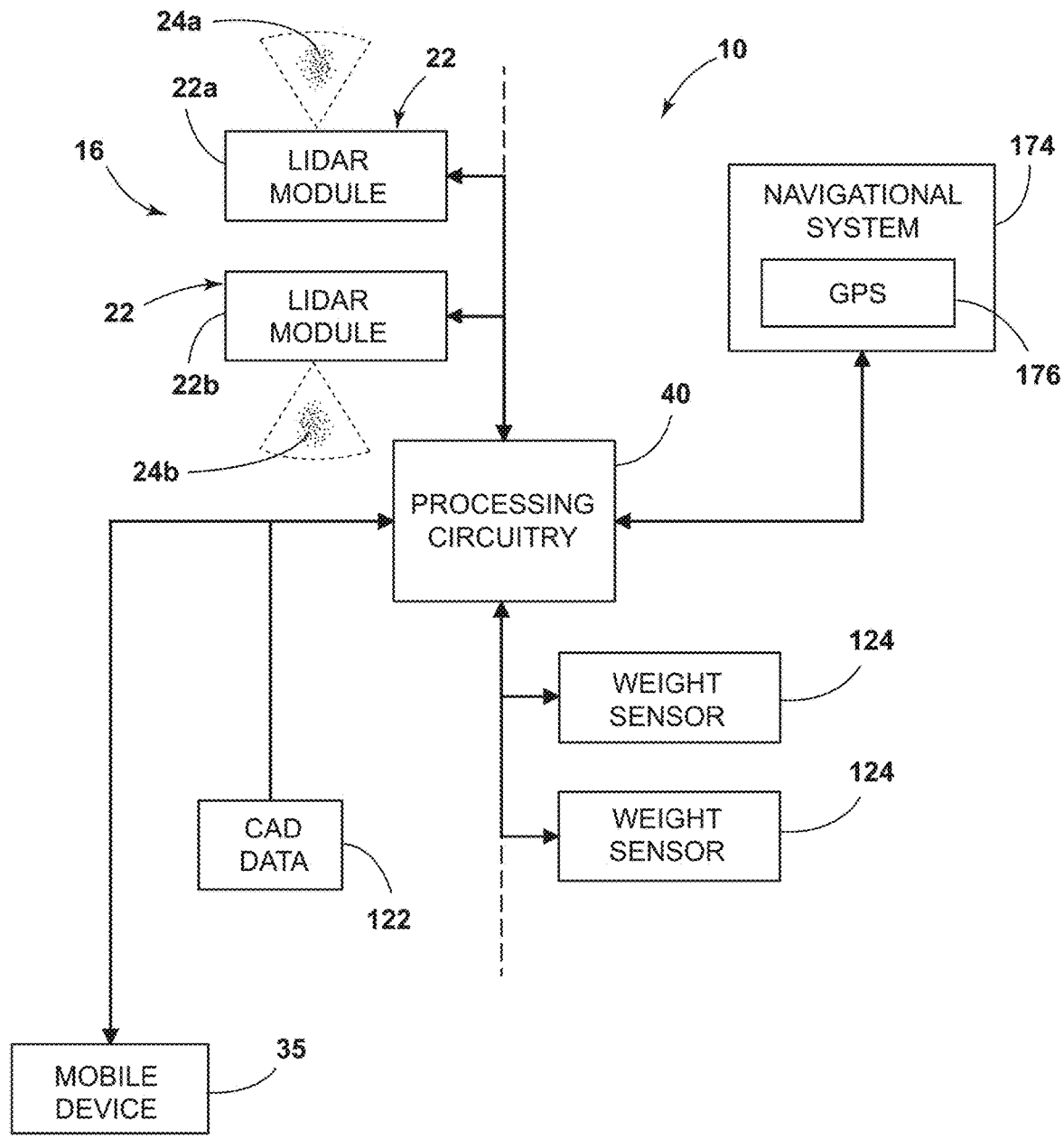
FIG. 10 is a block diagram of a detection system according to one aspect of the present disclosure.

Referring now to FIG. 10, the processing circuitry 40 may be in communication with the LiDAR modules 22 as well as the weight sensors 124 previously described. Further, the processing circuitry 40 may be in communication with the mobile device 35 or a plurality of mobile devices, which may employ the network 62 previously described to communicate with the processing circuitry 40. CAD data 122 related to the dimensional information for the vehicle 12 may also be in communication with the processing circuitry 40. For example, remote databases that will be further described with reference to FIG. 11 may include the CAD data 122 which may be compared to the target configuration and/or the at least one point cloud 24 generated by the LiDAR modules 22 in order to determine the availability of the target configuration. A navigational system 174, which may be one of the vehicle systems previously described, may also be in communication with the processing circuitry 40. The navigational system 174 may also be in communication with the mobile device 35 and/or include the mobile device 35 and be configured to predict and/or receive destination locations, initial locations, stopping points, or the like for suggesting routes between such locations. For example, the navigational system 174 may include a global positioning system (GPS) 176 or have access to the internet in order to calculate routes, estimate arrival times, travel durations, or the like.

Figure 11:
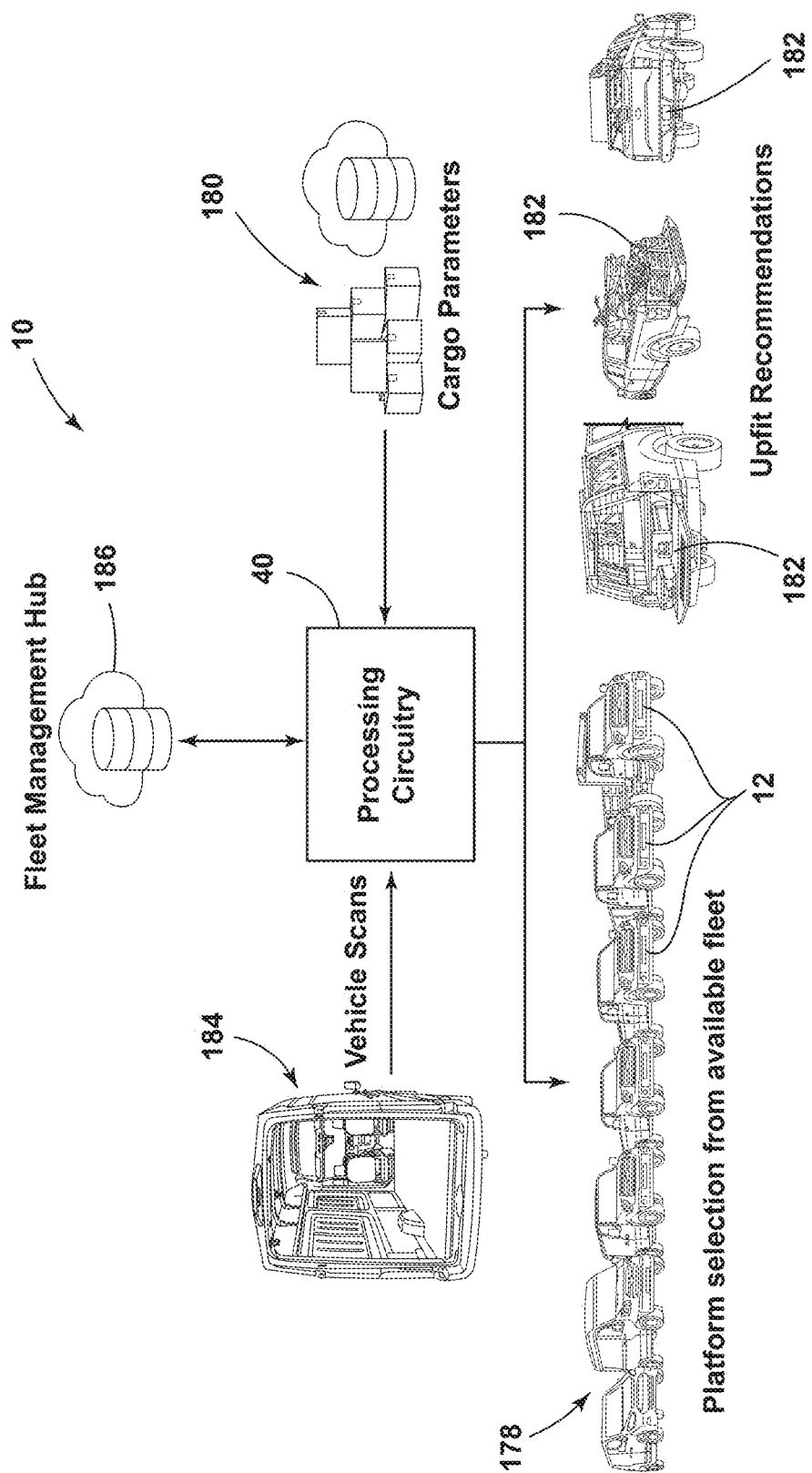
FIG. 11 is a functional diagram of a fleet management system operating as a global detection system of the present disclosure.

Referring now to FIG. 11, the detection system 10 may be utilized for operation with a fleet of vehicles 178 in order to determine target configurations for a fleet of vehicles 178, or a plurality of vehicles 178. For example, each of the fleet of vehicles 178 may incorporate the detection system 10, and each detection system 10 may be in communication with one another to create a global fleet management system 10. In this example, a loading plan for the fleet of vehicles 178 may be determined by the processing circuitry 40 based on a comparison of at least one point cloud 24 for each vehicle. As an example, a first vehicle and a second vehicle of the fleet of vehicles 178 may each have a time-of-flight sensor 16 that is configured to generate the at least one point cloud 24 of an environment 14 corresponding to the respective first and second vehicles. The processing circuitry 40 may then compare the at least one point cloud 24 captured in the environment 14 of the first vehicle to the at least one point cloud 24 of the environment 14 for the second vehicle, and determine the loading plan based on the comparison of those two point clouds 24. It is contemplated that this process may be carried out recursively across the entirety of the fleet of vehicles 178 in order to provide for an optimized loading plan for the fleet of vehicles 178.

With continued reference to FIG. 11, the processing circuitry 40 may be further configured to recommend particular enhancements or target configurations based on cargo parameters 180 that may be entered by the user via the user interface 74 or may be loaded automatically based on a bill of sale, packaging information scanned into the database 67 or another digital library, or the like. In other examples, the upfit recommendations may be input to the processing circuitry 40 by the user, at the user interface 74, or may be provided as choices for a given set of cargo parameters 180. For example, if 3 tons of cargo must be shipped to a desired location via the fleet of vehicles 178, the processing circuitry 40 may access scans 184 of the vehicle 12 to determine the spatial and/or max cargo weight limitations of each of the fleet of vehicles 178, and present to the user a plurality of options for morphing each of the vehicles 12 in the fleet of vehicles 178 in order to accomplish the 3-ton loading/ unloading plan. As depicted, the recommendations may include dynamic, static, or pseudo-dynamic morphing levels to accomplish the desired loading or unloading plan. In this way, the fleet management system 10 may provide flexibility by determining the options 182 for performing the loading plan and/or limiting other options 182 from the loading plan based on the cargo parameters 180. It is contemplated that, although previously described as an operation with the user interface 74, the fleet management system 10 may include a fleet management hub 186 at which the user may interact with and/or select the target configurations for each of the plurality of vehicles 178 and/or may enter or select limitations related to, for example, spatial optimization, style, comfort, or the like.

Figure 12:
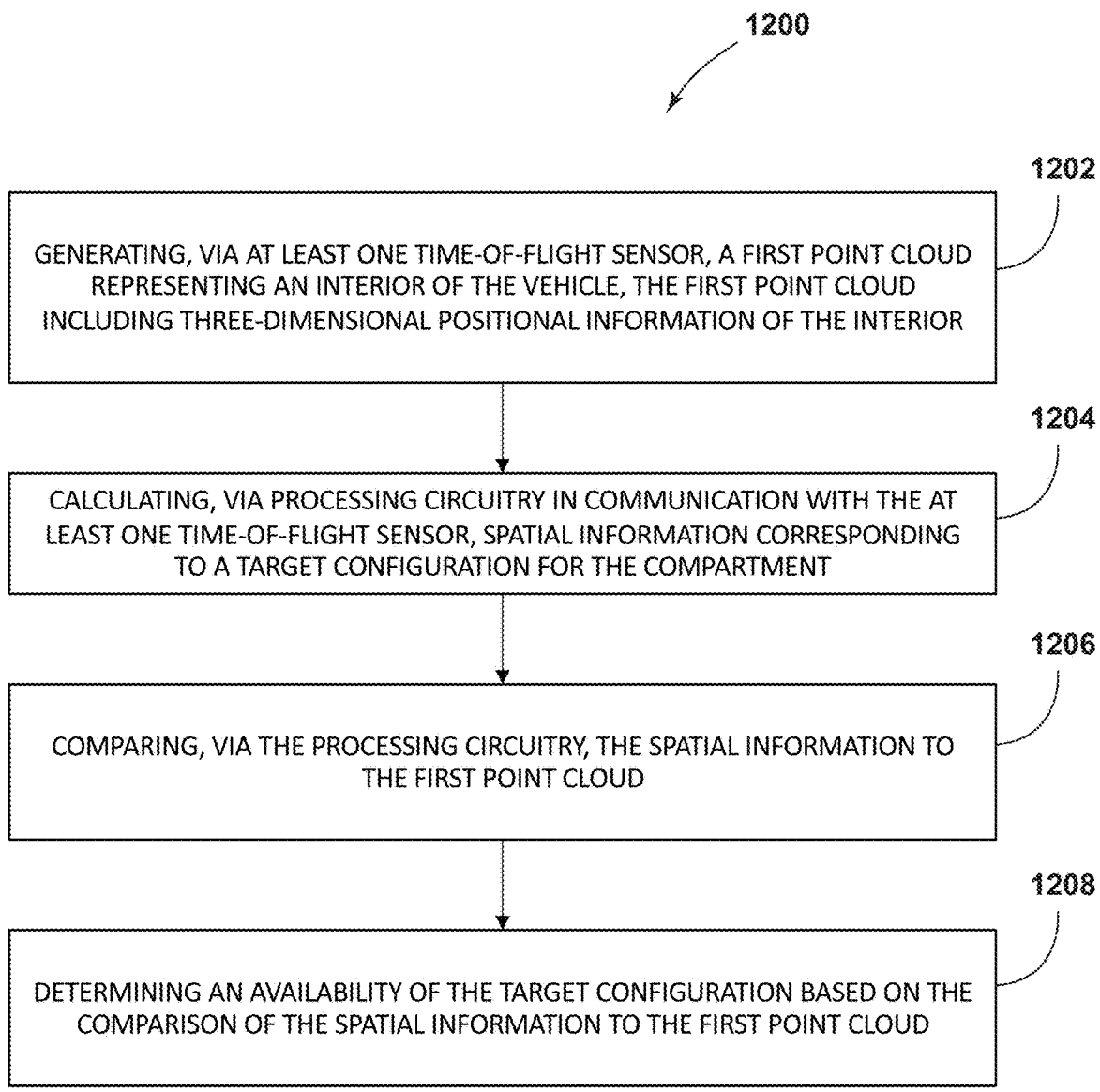
FIG. 12 is a method of determining spatial availability for a compartment of a vehicle according to one aspect of the present disclosure.

Referring now to FIG. 12, a method 1200 for determining spatial availability for the compartment 28 of the vehicle 12 includes generating, via at least one of the time-of-flight sensors 16, the first point cloud 24a representing the compartment 28 of the vehicle 12 at step 1202. The method further includes calculating, via the processing circuitry 40 in communication with the at least one time-of-flight sensor 16, spatial information corresponding to a target configuration for the compartment 28 at step 1204. The method 1200 further includes comparing, via the processing circuitry 40, the spatial information to the first point cloud 24a at step 1206. The method 1200 further includes determining an availability of the target configuration based on the comparison of the spatial information to the first point cloud 24a at step 1208. It is contemplated that the compartment 28 may be in the interior 18 of the vehicle 12 or may be accessible from the region exterior 20 to the vehicle 12.

In some examples, generation of the first point cloud 24a and/or the second point cloud 24b may be accomplished via the controller 48 for the LiDAR module 22 previously described, the first processor 40a previously described, and/or the second processor 40b previously described. Thus, any portion of the processing circuitry 40 or another processor may generate the at least one point cloud 24 based on the data captured by the LiDAR modules 22. It is further contemplated that the spatial information calculated by the processing circuitry 40 may include volumetric data, mass information, geometrical information, proportional data, or any other metric related to positional information about the compartment 28. It is further contemplated that the compartment 28 scanned by the time-of-flight sensor 16 may be the passenger cabin 32 previously described, the bed 160 of the truck 162, another exterior compartment, a different compartment 28 in the interior 18, such as the rear space of a cargo van 166, or any other compartment.

In other examples, the method 1200 may further include generating, via the at least one time-of-flight sensor 16, the second point cloud 24b of an object 138 to be loaded into the compartment 28. The method 1200 further may include calculating, via the processing circuitry 40, the dimensional data based on the second point cloud 24b. The dimensional data may refer to the measurement information of the object 138 to be loaded, such as a height, a weight, a width, a length, a geometry, a shape, or any other positional aspect of the object 138. It is further contemplated that the method 1200 may include determining the target configuration based on the dimensional data. Accordingly, and with reference back to FIG. 5, the pallet 130 of boxes 128 and/or the atypically-shaped package 132 may be the objects 138 to be loaded, and the dimensional data mapped via the LiDAR modules 22 may be fed to the processing circuitry 40, which may utilize the dimensional data to calculate the spatial information for the target configuration.

In some examples, the method 1200 further includes estimating a weight of the object 138 to be loaded based on the dimensional data. For example, the weight of the object 138 may not be otherwise known to the processing circuitry 40 and may be calculated based on estimations of density and/or volumetric information. In other examples, documentation related to bills of sales, inventories, or other information accessible by the processing circuitry 40 may include the packaging information, which may have the weight of the objects 138, the sizes of the objects 138, and/or other parameters. For example, the documentation may include an indication of a loading or unloading method (e.g., recommending a two-person lift, a single person left, a mechanically assisted lift process, etc.).

In other examples, the method 1200 includes identifying the cargo 37 in the compartment 28 based on the at least one point cloud 24 and estimating the load distribution of the cargo 37 in the vehicle 12. As previously described, the load distribution may relate to known weights or estimated weights of the objects 138, and scanning via the LiDAR modules 22 may provide the location/relative location of the objects 138 in the compartment 28 and allow the processing circuitry 40 to determine the load distribution. In other examples, the weight sensors 124 may be employed to validate or compare the estimated load distribution by the processing circuitry 40. Accordingly, the processing circuitry 40 may determine the unloading plan or the loading plan for the cargo 37 based on the load distribution calculated or estimated by the processing circuitry 40. It is also contemplated that the power management system 83 may communicate an instruction to the processing circuitry 40 to optimize the load distribution to conserve electrical power for the vehicle 12. For example, one or more batteries may be provided for the power management system 83, the power management system 83 may communicate a signal to recommend or select a load distribution as the target configuration. In some examples, the processing circuitry 40 may detect sub-optimal load distributions based on the at least one point cloud 24 and/or weight distribution detected by the weight sensor and recommend an organization for the cargo that enhances load distribution resulting in lower power consumption due to, for example, limiting necessary braking power (for a hydraulic pump or electric motors) due to an evenly distributed load. In this way, power consumption may be limited due to the detection system 10.

As previously described with respect to FIG. 5, the identity of an unloading source 140 for the cargo 37 may be determined by the processing circuitry 40 based on the unloading plan. For example, if the processing circuitry 40 determines the unloading plan based on the load distribution, the unloading plan may include determining an identity of the unloading source 140 (e.g., a human 142 or a mechanical assistance device 144). The identity may correspond to a work capacity of the unloading source 140. For example, the processing circuitry 40 may determine the unloading source 140 to be able to lift over 100 pounds, for example, or some other weight associated with the objects 138, a size of the objects 138, or another parameter of the objects 138. For example, if the pallet 130 is aboard the vehicle 12, the processor may determine that a Hi-Lo, a jack, a forklift 146, or the like, should be used to unload the vehicle 12. In other examples, the processing circuitry 40 may determine that the unloading source 140 is a human 142, and may further recommend the human 142 have particular attributes related to sex, age, or other factors relating to lifting/endurance capacity.

In other examples, the unloading plan includes the route information for the vehicle 12 previously described with respect to the navigational system 174. The processing circuitry 40 may be further configured to determine the route information based on the load distribution. For example, if certain unloading sources 140 and/or loading sources 140 are available at particular locations along a travel route, the order of stops along the travel route may be selected by the processing circuitry 40 to allow for more efficient unloading or loading plans. Accordingly, the processing circuitry 40 may determine a timing for the unloading plan based on the load distribution. The timing may be an arrival time, a departure time, or any other planned time along a target delivery route.

Figure 13:
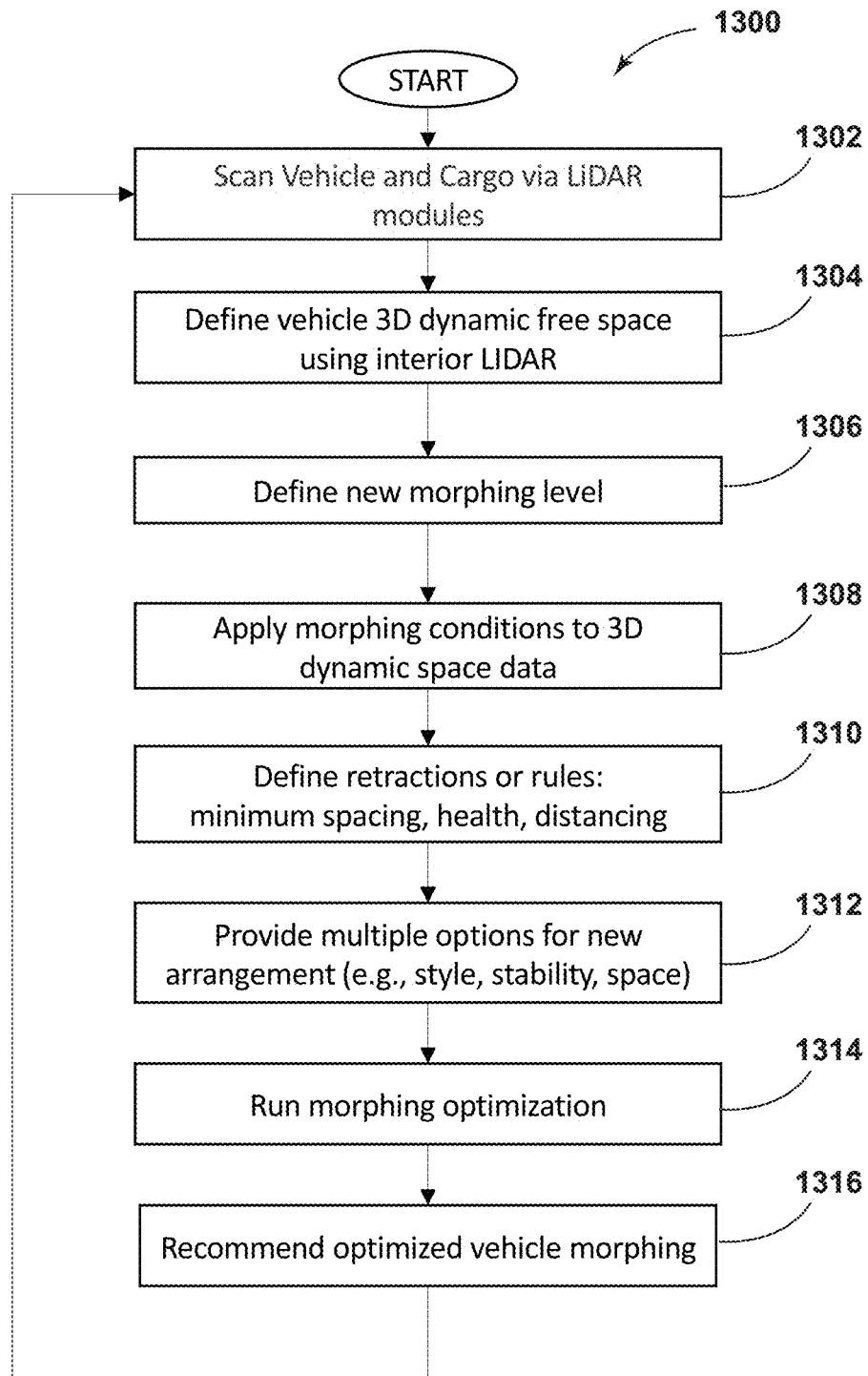
FIG. 13 is a block diagram of an exemplary process for optimizing space morphing for a compartment of a vehicle.

Referring now to FIG. 13, a process 1300 for determining spatial availability for the compartment 28 of the vehicle 12 may include scanning the vehicle 12 and the cargo 37 via the LiDAR modules 22 at step 1302. Simultaneously, the LiDAR modules 22 may scan the region exterior 20 to the vehicle 12 to detect and map any objects 138 to be loaded into the compartment 28. At step 1304, dynamic free space in the compartment 28 of the vehicle 12 is defined using the at least one point cloud 24 generated by the LiDAR module 22. At step 1306, a morphing level for the compartment 28, such as a dynamic morphing level, a static morphing level, or a pseudo-static morphing level is defined by the detection system 10. The morphing level may be selected by a user or otherwise suggested or determined by the processing circuitry 40. The morphing level is applied to the dynamic free space in the compartment 28 as mapped by the LiDAR module 22 at step 1308. For example, requisite mass, weight, volume, or general spatial availability may be determined for feasibility to morph the compartment 28. For example, a first level of availability may be determined based on the feasibility of volumetric changes to the free space. At step 1310, a second level of availability may be defined based on the remaining free space after the morphing conditions are applied. For example, parameters related to minimum spacing between occupants 26, the number of occupants 26 in the compartment 28, health parameters pertaining to individual occupants 26, or other distancing requirements may be manually entered, determined by the processing circuitry 40, or otherwise incorporated into the detection system 10 to further refine the availability at the second availability level for determining the feasibility of the morphing level.

Once a final availability is determined by the detection system 10, the processing circuitry 40 may limit the options for the particular morphing conditions to a number of options 182 at step 1312. The processing circuitry 40 may rank or order the number of options 182 based on a preferred user parameter, such as style, stability, or space. For example, different target configurations may have different levels of optimization. As previously described, and by way of example, if a passenger cabin 32 is intended to be transformed to have a kitchen/living area 168, the particular kitchen/living arrangement selected by the user may be one of a plurality of options 182 that are available. A first option for the kitchen/living area 168 may prioritize style (e.g., color, geometries, materials employed for fixtures). A second option may optimize stability for maneuvering and controlling the vehicle 12. In this way, the second option may prioritize load distribution normalization. For example, the second option may locate the kitchen and living area 168 features centrally along a median line of the vehicle 12 or peripherally to allow for the center of mass to be equally displaced in the compartment 28. A third option that prioritizes space may further be offered for selection, which may recommend smaller fixtures (e.g., smaller sinks, a smaller bed, a smaller seating arrangement). As previously described, the options 182 may also be limited or prioritized by access to electrical and/or water, or other utility accesses. For example, if heating, ventilation, and air conditioning (HVAC) connections are distributed toward the central portion of the compartment 28, walking spaces may be available in the central areas to allow for optimal climate conditions throughout areas most commonly used in the kitchen/living area 168. It is contemplated the kitchen/living area 168 example of the present disclosure is nonlimiting and exemplary in nature. Other target configurations and/or arrangements may be requested by the user and/or determined by the processing circuitry 40 and relate to specific functions. For example, although not described in detail herein, an accessory for handicap accessibility to the compartment 28 may be a static or pseudo-static morphing level that may be analyzed by the processing circuitry 40 to determine the availability for such a modification.

At step 1314, the process 1300 may run a morphing optimization to select the optimal arrangement for the given parameters entered by the user and/or selected by the processing circuitry 40. Based on the optimization, the processing circuitry 40 may be configured to recommend the optimized morphing arrangement at step 1316. It is contemplated that, following a morphing, such as after unloading or loading cargo 37, permanently modifying the structure of the compartment 28 (e.g., a static morphing), or temporarily modifying the structure of the vehicle 12 (e.g., a pseudo-static morphing), the process 1300 may repeat steps 1302 through 1316 in order to map the new environment for further optimization of the compartment 28 for space management.

In general, the present detection system 10 may provide for effective transformability using the LiDAR modules 22. The detection system 10 analyzes, preplans, and provides optimal schema for utilizing space in vehicles 12 based on content geometry, weight, and style, and provides real-time data of the spatial changes. Accordingly, methods and techniques applied by the detection system 10 may incorporate guidance for target configurations that offer optimal load distribution, style preferences, or any other parameter selected by the user or the processing circuitry 40. Such optimal morphing recommendations may provide for effective power consumption due to balanced loads, optimized climate control placement relative to occupant positions, or any other parameter optimized based on the target configuration.

With regard to commercial applications and/or livery/delivery services, the present detection system 10 may further provide for a recommending optimized organization for the compartment 28 based on the at least one point cloud 24 of the cargo 37 or objects to be loaded. Further, using interior or exterior interior LiDAR modules 22 or reading from specification data from a specification sheet, purchase order, or other documentation of the load, load distributions may be analyzed for optimal placement recommendations. Inventory devices, such as barcode scanners or other scanning devices may capture the specification information, which may then be compiled with the at least one point cloud 24 by the detection system 10 to optimize load distribution in the compartment 28.

Other enhancements may be provided by the detection system 10, including adjustments for target routes to delivery or loading points as previously described. For example, enhanced scheduling may be provided based on adjustments to arrival time as determined by the processing circuitry 40. In this way, the detection system 10 may save time by adjusting time estimates due to the load distribution and determined availability in each vehicle for a fleet operation or a single-vehicle operation. Further, the cargo 37 may further be organized by the present detection system 10 based on the type of cargo 37 (e.g., contents being liquids, glass, powder, etc.) to limit contact with the objects and or limit jostling. Accordingly, the space may be optimized to enhance securement of the cargo 37. Further, the strength or sharpness of boxes 128 or other cargo 37 may be estimated based on the at least one point cloud 24 to allow the processing circuitry 40 to determine optimal placement. In this way, dynamic updates to the cargo compartment localization and management may effectuate change to loading/unloading and distributions as a function of time and/or location.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method for determining spatial availability for a compartment of a vehicle, the method comprising:
   generating, via at least one time-of-flight sensor, a first point cloud representing the compartment of the vehicle, the first point cloud including three-dimensional positional information of the compartment;
   calculating, via processing circuitry in communication with the at least one time-of-flight sensor, spatial information corresponding to a target configuration for the compartment;
   comparing, via the processing circuitry, the spatial information to the first point cloud;
   determining an availability of the target configuration based on the comparison of the spatial information to the first point cloud;
   identifying cargo in the compartment based on the first point cloud; and
   estimating a load distribution of the cargo, wherein determining the availability is based further on the load distribution.

2. The method of claim 1, further comprising:
   determining the target configuration based on an occupancy condition of the compartment.

3. The method of claim 2, wherein the occupancy condition includes a number of occupants and a minimum spacing between the number of occupants.

4. The method of claim 1, further comprising:
   determining the target configuration based on dimensional data of an object to be loaded into the compartment.

5. The method of claim 4, further comprising:
   generating, via the at least one time-of-flight sensor, a second point cloud representing the object to be loaded into the compartment, the second point cloud including three-dimensional positional information of the object; and
   calculating, via the processing circuitry, the dimensional data based on the second point cloud.

6. The method of claim 5, wherein the at least one time-of-flight sensor includes a first LiDAR module in the vehicle configured to capture the first point cloud and a second LiDAR module configured to capture the second point cloud.

7. The method of claim 4, further comprising:
   estimating a weight of the object based on the dimensional data, wherein determining the availability is based further on the weight of the object.

8. The method of claim 1, further comprising:
   determining, via the processing circuitry, an unloading plan for the cargo based on the load distribution.

9. The method of claim 8, further comprising:
   determining an identity of an unloading source for the cargo based on the unloading plan, wherein the identity corresponds to a work capacity of the unloading source.

10. The method of claim 8, wherein the unloading plan includes route information for the vehicle, and further comprising:
determining the route information based on the load distribution.

11. The method of claim 8, further comprising:
determining a timing for the unloading plan based on the load distribution.

12. The method of claim 11, wherein the timing is an arrival time for the vehicle along a target delivery route.

13. The method of claim 1, wherein the vehicle is a first vehicle of a fleet of vehicles, and further comprising:
generating, via the at least one time-of-flight sensor, a second point cloud of a loading region of a second vehicle of the fleet of vehicles, the second point cloud including three-dimensional positional information of the compartment;
comparing the first point cloud to the second point cloud; and
determining a loading plan for the fleet of vehicles based on the comparison of the first point cloud to the second point cloud.

14. A system for determining spatial availability for a compartment of a vehicle, the system comprising:
at least one time-of-flight sensor configured to generate a first point cloud representing the compartment of the vehicle, the first point cloud including three-dimensional positional information of the compartment; and
processing circuitry in communication with the at least one time-of-flight sensor configured to:
calculate spatial information corresponding to a target configuration for the compartment;
compare the spatial information to the first point cloud; and
determine an availability of the target configuration based on the comparison of the spatial information to the first point cloud,
wherein the at least one time-of-flight sensor includes a first LiDAR module in the vehicle configured to capture the first point cloud and a second LiDAR module configured to capture a second point cloud of an object to be loaded into the compartment, wherein the second point cloud includes three-dimensional positional information of the object.

15. The system of claim 14 wherein the processing circuitry is further configured to determine the target configuration based on an occupancy condition of the compartment.

16. The system of claim 15, wherein the occupancy condition includes a number of occupants and a minimum spacing between the number of occupants.

17. A method for determining spatial availability for a compartment of a vehicle, the method comprising:
generating, via at least one LiDAR module, a first point cloud representing an interior of the vehicle, the first point cloud including three-dimensional positional information of the interior;
generating, via the at least one LiDAR module, a second point cloud representing an object to be loaded into the compartment of the vehicle, the second point cloud including three-dimensional positional information of the object;
calculating, via processing circuitry in communication with the at least one LiDAR module, dimensional data of the object to be loaded based on the second point cloud;
determining, via the processing circuitry, a target configuration based on the dimensional data of the object to be loaded;
calculating, via the processing circuitry, spatial information corresponding to the target configuration for the compartment;
comparing, via the processing circuitry, the spatial information to the first point cloud; and
determining an availability of the target configuration based on the comparison of the spatial information to the first point cloud.

18. The method of claim 17, wherein the at least one LiDAR module includes a first LiDAR module in the vehicle configured to capture the first point cloud and a second LiDAR module configured to capture the second point cloud.

* * * * *